US012707377B2

(12) United States Patent
Raghavan et al.

(10) Patent No.: US 12,707,377 B2
(45) Date of Patent: Aug. 11, 2026

(54) SCAN RANGE MODIFICATION WITH ADAPTIVE FREQUENCY BAND USAGE FOR MULTI-BAND ANTENNA PANELS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 18/162,577

(22) Filed: Jan. 31, 2023

(65) Prior Publication Data

US 2024/0259920 A1 Aug. 1, 2024

(51) Int. Cl.
*H04W 48/16* (2009.01)
*H04W 8/22* (2009.01)

(52) U.S. Cl.
CPC ............. *H04W 48/16* (2013.01); *H04W 8/22* (2013.01)

(58) Field of Classification Search
CPC ................................ H04W 8/22; H04W 48/16
See application file for complete search history.

(56) References Cited

U.S. PATENT DOCUMENTS

| | | | | |
|---|---|---|---|---|
| 10,211,899 | B1 * | 2/2019 | Liu | H04B 7/0617 |
| 2011/0151790 | A1 | 6/2011 | Khandekar et al. | |
| 2017/0294705 | A1 * | 10/2017 | Khripkov | H01Q 1/38 |
| 2021/0250947 | A1 * | 8/2021 | Ryu | H04L 5/0096 |
| 2025/0227713 | A1 * | 7/2025 | Noh | H04W 72/0453 |

OTHER PUBLICATIONS

International Search Report and Written Opinion—PCT/US2024/010044—ISA/EPO—Apr. 24, 2024 (2208717WO).

* cited by examiner

*Primary Examiner* — Dai Phuong
(74) *Attorney, Agent, or Firm* — Holland & Hart LLP

(57) ABSTRACT

Methods, systems, and devices for wireless communications are described. A user equipment (UE) may transmit a capability message indicating a capability to support a set of frequency bands for wireless communications with an antenna panel. Based on the capability, the UE may receive a first control message from a network entity indicating a portion of the set of frequency bands to use for further wireless communications based on the network entity determining an interference between a set of UEs including the UE and the UE satisfying a threshold interference value. The set of frequency bands may relate to a beamforming scan range. As such, the UE may transmit further wireless communications via a frequency band of the portion of the set of frequency bands based on the first control message and the beamforming scan range.

20 Claims, 19 Drawing Sheets

Receive a capability message indicating a capability of a UE to support a set of multiple frequency bands for wireless communications with an antenna panel

1605

Transmit, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range

1610

1600

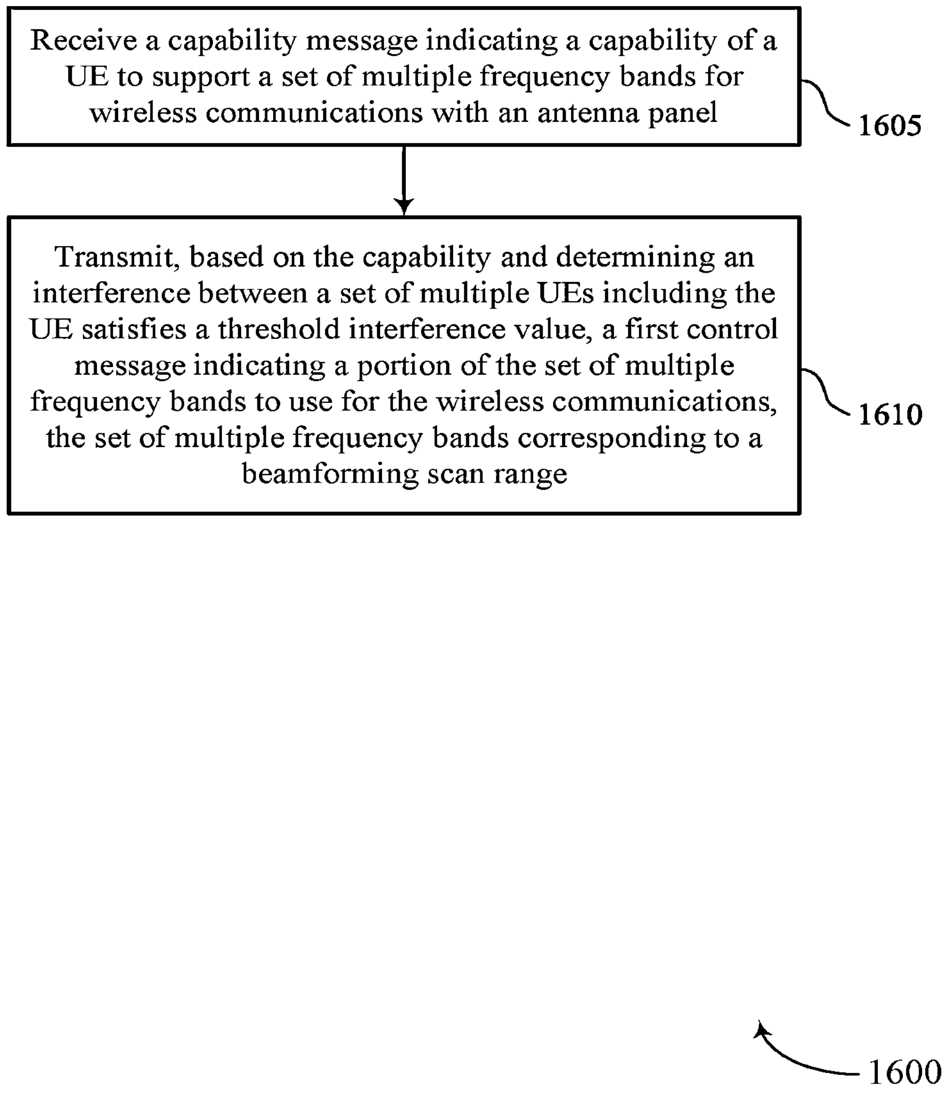

FIG. 16

SCAN RANGE MODIFICATION WITH ADAPTIVE FREQUENCY BAND USAGE FOR MULTI-BAND ANTENNA PANELS

TECHNICAL FIELD

The following relates to wireless communications, including scan range modification with adaptive frequency band usage for multi-band antenna panels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support scan range modification with adaptive frequency band usage for multi-band antenna panels. For example, the described techniques provide for a user equipment (UE) to transmit a capability message indicating a capability to support a set of frequency bands for wireless communications with a single antenna panel. Based on the capability, the UE may receive a first control message from a network entity indicating a portion (e.g., a subset) of the set of frequency bands to use for further wireless communications based on the network entity determining an interference between a set of UEs including the UE and the UE satisfying a threshold interference value. In some cases, the set of frequency bands may relate to a beamforming scan range. As such, the UE may transmit further wireless communications via a frequency band of the portion of the set of frequency bands based on the first control message and the beamforming scan range.

A method for wireless communication at a UE is described. The method may include transmitting a capability message indicating a capability of the UE to support a set of multiple frequency bands for wireless communications with an antenna panel, receiving, based on the capability, a first control message indicating a portion of the set of multiple frequency bands to use for the wireless communications, the set of multiple frequency bands corresponding to a beamforming scan range, and transmitting, based on the beamforming scan range, the wireless communications via a frequency band of the portion of the set of multiple frequency bands.

An apparatus for wireless communication at a UE is described. The apparatus may include at least one processor, and memory coupled (e.g., operatively, communicatively, functionally, electronically, or electrically) with the at least one processor, the memory storing instructions. The instructions may be executable by the processor (e.g., directly, indirectly, after pre-processing, without pre-processing) to cause the UE to transmit a capability message indicating a capability of the UE to support a set of multiple frequency bands for wireless communications with an antenna panel, receive, based on the capability, a first control message indicating a portion of the set of multiple frequency bands to use for the wireless communications, the set of multiple frequency bands corresponding to a beamforming scan range, and transmit, based on the beamforming scan range, the wireless communications via a frequency band of the portion of the set of multiple frequency bands.

Another apparatus for wireless communication at a UE is described. The apparatus may include means for transmitting a capability message indicating a capability of the UE to support a set of multiple frequency bands for wireless communications with an antenna panel, means for receiving, based on the capability, a first control message indicating a portion of the set of multiple frequency bands to use for the wireless communications, the set of multiple frequency bands corresponding to a beamforming scan range, and means for transmitting, based on the beamforming scan range, the wireless communications via a frequency band of the portion of the set of multiple frequency bands.

A non-transitory computer-readable medium storing code for wireless communication at a UE is described. The code may include instructions executable by at least one processor to transmit a capability message indicating a capability of the UE to support a set of multiple frequency bands for wireless communications with an antenna panel, receive, based on the capability, a first control message indicating a portion of the set of multiple frequency bands to use for the wireless communications, the set of multiple frequency bands corresponding to a beamforming scan range, and transmit, based on the beamforming scan range, the wireless communications via a frequency band of the portion of the set of multiple frequency bands.

Some examples of the method, apparatuses, and non-transitory computer-readable medium described herein may further include operations, features, means, or instructions for transmitting an indication of an interference between a set of multiple UEs including the UE in the capability message, the interference associated with one or more grating lobes, one or more side lobes, or both corresponding to the antenna panel.

In some examples of the method, apparatuses, and non-transitory computer-readable medium described herein, the set of multiple UEs may be associated with a same cell.

In some examples of the method, apparatuses, and non-transitory computer-readable medium described herein, the set of multiple UEs may be associated with a set of multiple different cells.

Some examples of the method, apparatuses, and non-transitory computer-readable medium described herein may further include operations, features, means, or instructions for transmitting an indication of a transmission configuration indicator (TCI) state corresponding to the UE, where the portion of the set of multiple frequency bands and the beamforming scan range may be based on the indication of the TCI state corresponding to the UE.

Some examples of the method, apparatuses, and non-transitory computer-readable medium described herein may further include operations, features, means, or instructions for receiving a second control message indicating for the UE to switch from a first beam to a second beam with a beamwidth within the beamforming scan range for transmitting the wireless communications based on receiving the first control message, where the second beam corresponds to a reduction in interference from the first beam.

In some examples of the method, apparatuses, and non-transitory computer-readable medium described herein, the first control message indicating the portion of the set of multiple frequency bands includes an indication of respective frequency bands of the portion of the set of multiple frequency bands.

In some examples of the method, apparatuses, and non-transitory computer-readable medium described herein, the first control message indicating the portion of the set of multiple frequency bands includes a frequency range including the portion of the set of multiple frequency bands.

In some examples of the method, apparatuses, and non-transitory computer-readable medium described herein, the first control message may be a broadcast message to a set of multiple UEs including the UE.

A method for wireless communication at a network entity is described. The method may include receiving a capability message indicating a capability of a UE to support a set of multiple frequency bands for wireless communications with an antenna panel and transmitting, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

An apparatus for wireless communication at a network entity is described. The apparatus may include at least one processor, and memory coupled (e.g., operatively, communicatively, functionally, electronically, or electrically) with the at least one processor, the memory storing instructions. The instructions may be executable by the processor (e.g., directly, indirectly, after pre-processing, without pre-processing) to cause the network entity to receive a capability message indicating a capability of a UE to support a set of multiple frequency bands for wireless communications with an antenna panel and transmit, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

Another apparatus for wireless communication at a network entity is described. The apparatus may include means for receiving a capability message indicating a capability of a UE to support a set of multiple frequency bands for wireless communications with an antenna panel and means for transmitting, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

A non-transitory computer-readable medium storing code for wireless communication at a network entity is described. The code may include instructions executable by at least one processor to receive a capability message indicating a capability of a UE to support a set of multiple frequency bands for wireless communications with an antenna panel and transmit, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

In some examples of the method, apparatuses, and non-transitory computer-readable medium described herein, determining the interference between the set of multiple UEs including the UE satisfies the threshold interference value may include operations, features, means, or instructions for receiving respective indications of a TCI state corresponding to respective UEs of the set of multiple UEs, estimating the interference based on the capability message, the interference, and the respective indications of the TCI state corresponding to respective UEs, and comparing the interference to the threshold interference value.

In some examples of the method, apparatuses, and non-transitory computer-readable medium described herein, the portion of the set of multiple frequency bands and the beamforming scan range may be based on the respective indications of the TCI state corresponding to the set of multiple UEs.

In some examples of the method, apparatuses, and non-transitory computer-readable medium described herein, determining the interference between the set of multiple UEs including the UE satisfies the threshold interference value may include operations, features, means, or instructions for receiving a second control message indicating the interference and comparing the interference to the threshold interference value.

Some examples of the method, apparatuses, and non-transitory computer-readable medium described herein may further include operations, features, means, or instructions for transmitting a second control message indicating for the UE to switch from a first beam to a second beam with a beamwidth within the beamforming scan range for the wireless communications based on transmitting the first control message, where the second beam corresponds to a reduction in interference from the first beam.

In some examples of the method, apparatuses, and non-transitory computer-readable medium described herein, the first control message indicating the portion of the set of multiple frequency bands includes an indication of respective frequency bands of the portion of the set of multiple frequency bands.

In some examples of the method, apparatuses, and non-transitory computer-readable medium described herein, the first control message indicating the portion of the set of multiple frequency bands includes a frequency range including the portion of the set of multiple frequency bands.

In some examples of the method, apparatuses, and non-transitory computer-readable medium described herein, the first control message may be a broadcast message to the set of multiple UEs.

BRIEF DESCRIPTION OF THE DRAWINGS

FIGS. 13 through 19 illustrate flowcharts showing methods that support scan range modification with adaptive frequency band usage for multi-band antenna panels in accordance with one or more aspects of the present disclosure.

DETAILED DESCRIPTION

Figure 1:
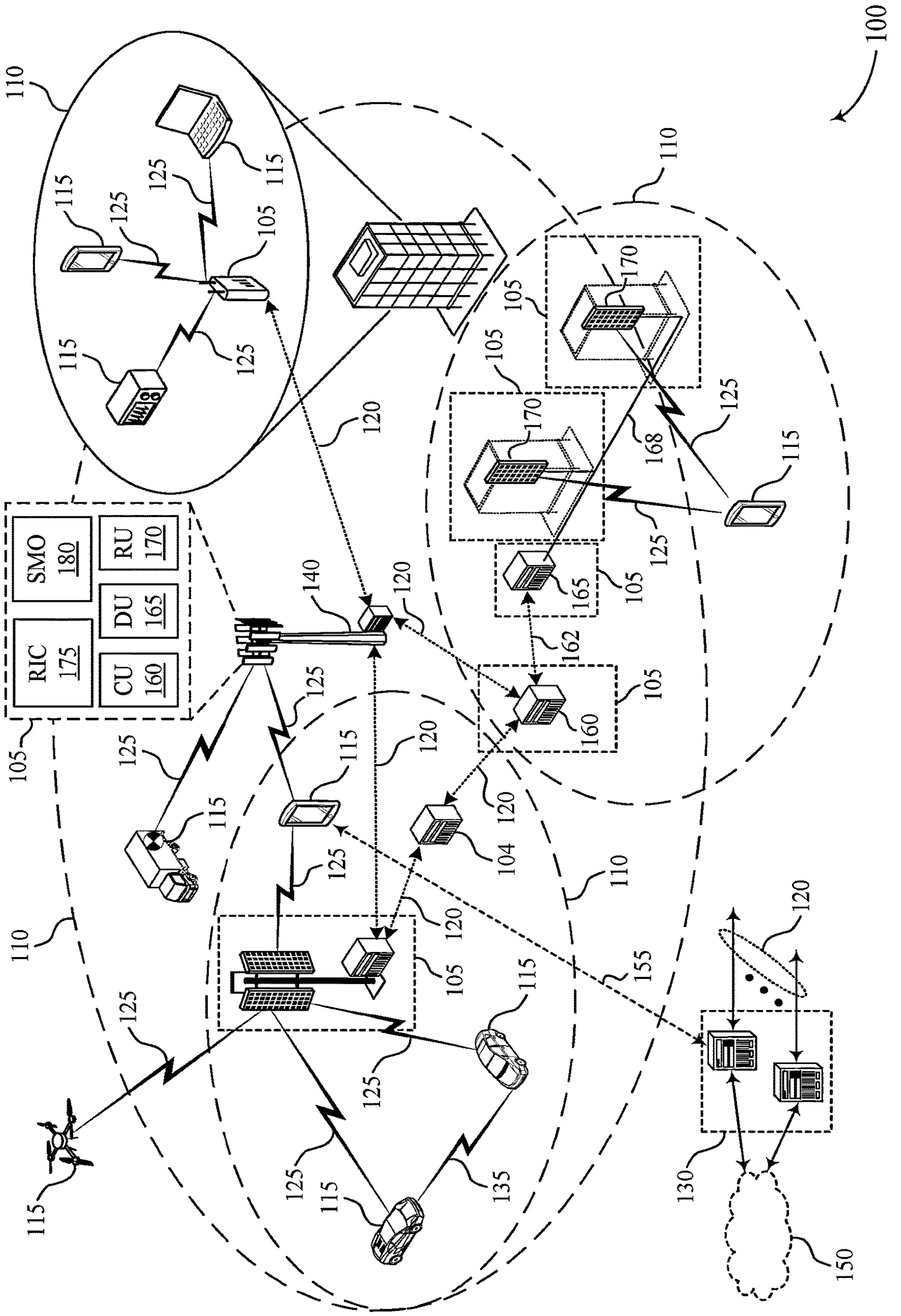
FIG. 1 illustrates an example of a wireless communications system that supports scan range modification with adaptive frequency band usage for multi-band antenna panels in accordance with one or more aspects of the present disclosure.

In some wireless communication systems, one or more wireless devices may operate across multiple frequency bands, or frequency ranges, including millimeter wave (mmWave) frequency bands. In some examples, a user equipment (UE) may use a set of antenna elements to steer a beam in a direction. The beam's pattern may include a main lobe and one or more side lobes. However, the UE may be unable to allocate a separate antenna panel to each of the different frequency ranges over which the UE operates due to space, cost, and complexity constraints. As such, the UE may use a multi-band antenna panel to support wireless communications across a broad range of frequencies. In some cases, an inter-antenna element spacing of the multi-band antenna panel may be relatively large to provide for operation across a broad range of frequencies. However, if an inter-antenna element spacing exceeds a threshold value (e.g., unique to each direction), the UE may produce grating lobes, which may be side lobes with amplitudes larger than an average or expected side lobe. In some examples, the grating lobes may cause interference at neighboring wireless devices, resulting in communication errors or lower throughput at the neighboring wireless devices.

Techniques of the present disclosure may support preventing interference between neighboring UEs caused by the grating lobes generated by increased inter-antenna element spacings. In some cases, UEs may transmit a capability message to a network entity indicating that the UE may use or be associated with a multi-band antenna panel. Further, the capability message may also indicate a range of supported frequencies by the UE using the multi-band antenna panel.

During communications, the network entity may receive an indication from a UE, such as a low mobility UE, indicating interference from another UE. Based on this indication, the network entity may transmit a control message instructing the interfering UE(s) to reduce a scan range at some frequencies. In some cases, the network entity may not be able to determine which UE within a cell is causing the interference and may broadcast the message to all UEs within the cell or all UEs within the cell that have indicated the capability to support the multi-band antenna module configuration. In some other cases, the network entity may know which UE or group of UEs are causing the interference and may transmit UE-specific messages indicating that the UEs should reduce the scan range. Additionally, or alternatively, the network entity may know the direction of the interference and may broadcast the control message to the group of UEs in the direction of the interference. In some examples, based on receiving the message to reduce the scan range, a UE may determine that a reduction of the scan range of the current communication beam may be insufficient for communication. In such cases, the UE may perform a beam change procedure and switch to a beam that may reduce the interference without reducing the scan range. Thus, by performing the beam change procedure or reducing the scan range of a beam, neighboring UEs may experience less interference, which may result in increased communications efficiency.

Aspects of the disclosure are initially described in the context of wireless communications systems. Additional aspects of the disclosure are described with reference to an antenna array gain diagram, a wireless communication system, and a process flow. Aspects of the disclosure are further illustrated by and described with reference to apparatus diagrams, system diagrams, and flowcharts that relate to scan range modification with adaptive frequency band usage for multi-band antenna panels.

FIG. 1 illustrates an example of a wireless communications system 100 that supports scan range modification with adaptive frequency band usage for multi-band antenna panels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support scan range modification with adaptive frequency band usage for multi-band antenna panels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communication system 100, one or more wireless devices (e.g., UEs 115, network entities 105) may operate across multiple frequency bands, or frequency ranges, including mmWave frequency bands. In some examples, a UE 115 may use an antenna to steer a beam in a direction (e.g., a directional beam), where the beam may include a main lobe and one or more side lobes. However, the UE 115 may be unable to allocate a separate antenna panel to each of the different frequency ranges due to space, cost, and complexity constraints. As such, the UE 115 may implement a multi-band antenna panel, to support wireless communications across a broad range of frequencies. In some cases, an inter-antenna element spacing of the multi-band antenna panel may be relatively large to provide for operation across a broad range of frequencies. However, if an inter-antenna element spacing exceeds a threshold value (e.g., unique to each direction), the UE 115 may produce grating lobes, which may be side lobes with amplitudes larger than an average side lobes. In some examples, the grating lobes may cause interference at neighboring wireless devices, resulting in communication errors or lower throughput at the neighboring wireless devices.

Techniques of the present disclosure may support preventing interference between neighboring UEs 115 caused by the grating lobes generated by increased inter-antenna element spacings. In some cases, UEs 115 may transmit a capability message to a network entity 105 indicating that the UE 115 may use or be associated with a multi-band antenna panel. Further, the capability message may also indicate a range of supported frequencies by the UE 115 using the multi-band antenna panel. During communications, the network entity 105 may receive an indication from a UE 115, such as a low mobility UE 115, indicating interference from another UE 115. Based on this indication, the network entity 105 may transmit a control message instructing the interfering UE(s) 115 to reduce a scan range at some frequencies. In some cases, the network entity 105 may not be able to determine which UE 115 within a cell is causing the interference and may broadcast the message to all UEs 115 within the cell or all UEs 115 within the cell that have indicated the capability to support the multi-band antenna module configuration. In some other cases, the network entity 105 may know which UE 115 or group of UEs 115 are causing the interference and may transmit UE 115 specific messages indicating to reduce the scan range. Additionally, or alternatively, the network entity 105 may know a direction of the interference and may broadcast the control message to the group of UEs 115 in the direction of the interference. In some examples, based on receiving the message to reduce the scan range, a UE 115 may determine that a reduction of the scan range of the current communication beam may be insufficient for communication. In such cases, the UE 115 may perform a beam change procedure and switch to a beam that may reduce the interference without reducing the scan range. Thus, by performing the beam change procedure or reducing the scan range of a beam, neighboring UEs 115 may experience less interference, which may result in increased efficiency in communications.

Figure 2:
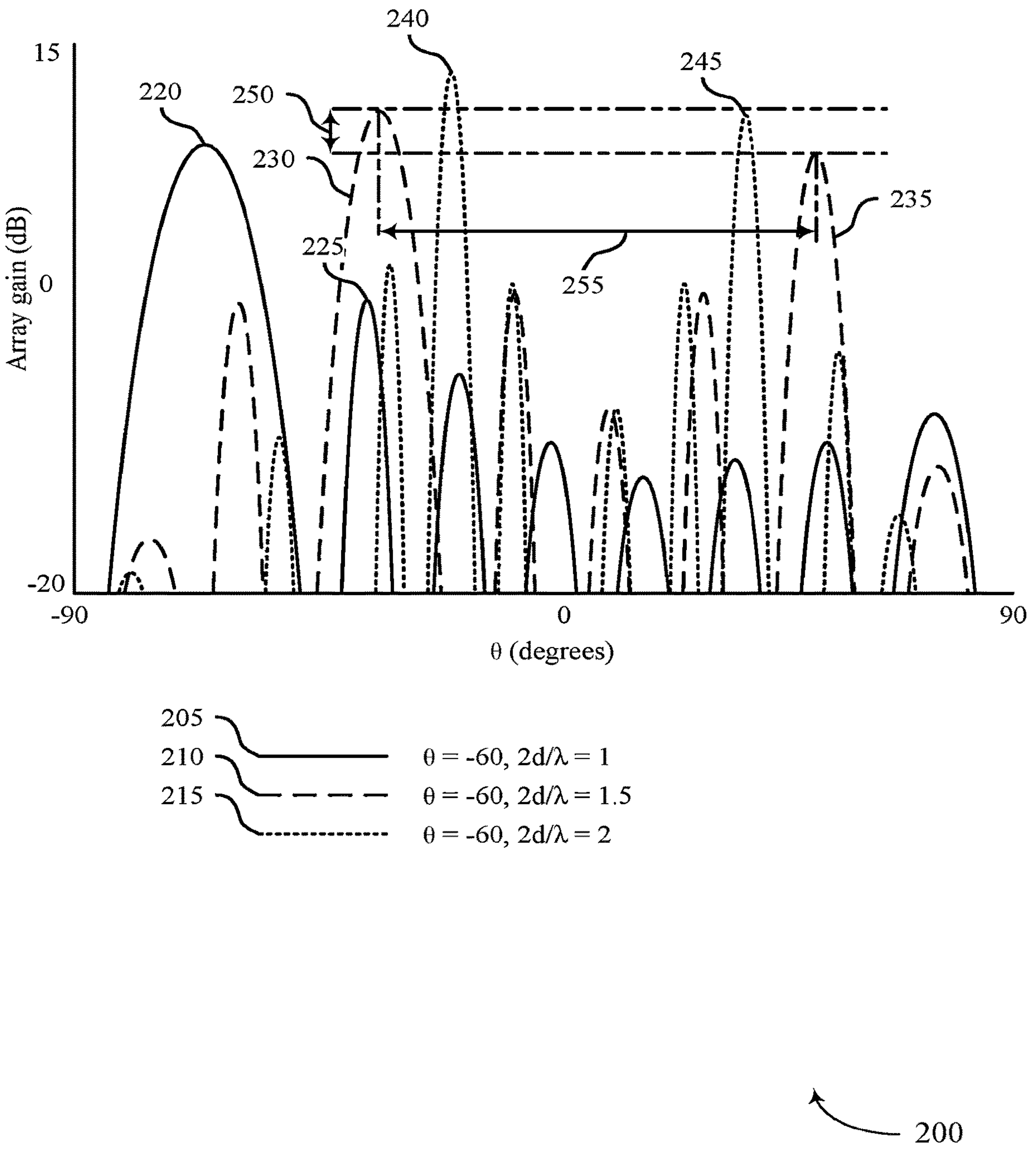
FIG. 2 illustrates an example of an antenna array gain diagram that supports scan range modification with adaptive frequency band usage for multi-band antenna panels in accordance with one or more aspects of the present disclosure.

FIG. 2 illustrates an example of an antenna array gain diagram 200 that supports scan range modification with adaptive frequency band usage for multi-band antenna panels in accordance with one or more aspects of the present disclosure. In some examples, the antenna array gain diagram 200 may implement or be implemented by the wireless communication system 100. For example, the antenna array gain diagram 200 may describe the effects of inter-antenna element spacings of a UE 115, which may represent examples of corresponding devices described herein. The antenna array gain diagram 200 may illustrate the antenna array gain of lobes for different beams at different inter-antenna element spacings. In this example, the antenna array gain diagram 200 may illustrate a beam 205, a beam 210, and a beam 215 and the antenna gain of the lobes of the respective beams measured in decibels (dB) with respect to the angle of the lobes in degrees.

In some wireless communication systems (e.g., the wireless communication system 100 with respect to FIG. 1), wireless devices such as network entities 105 and UEs 115 may communicate using mm Wave communications. The mmWave communications may use a frequency range 2 (FR2) which may span a relatively small number of frequencies bands (e.g., n257-n261: 26,500 MHz-28,300 MHz). As these frequencies may be relatively close to each other, UEs 115 may use a similar or the same beamforming configuration and antenna configuration across the frequency range. However, as FR2 evolves and expands to cover a relatively larger frequency spectrum (e.g., 26,500 MHz-71,000 MHz), using the same antenna modules for beamforming may not be efficient.

As such, when communicating using a wider range of frequencies, a UE 115 may use different antenna modules for beamforming at different frequency ranges. However, designing multiple different antenna modules may be inefficient at the UE 115. For example, if using multiple different antenna modules, a UE 115 may implement multiple antenna panels for the different frequency ranges. Implementing multiple antenna panels may cause the implementation of more radio-frequency integrated circuits (RFICs), however implementing more RFICs may be more time consuming to design and may cost more relative to implementing a single antenna module. Additionally, or alternatively, there may not be space at the UE 115 to deploy additional antenna modules. Further, performing beam switching operations between the multiple antenna modules may be a complex operation that may be time consuming, causing inefficient communications at the UE 115 and increased latency.

As the addition of antenna modules may be complex, costly, or inefficient, the UE 115 may implement a multi-band antenna module to cover the wider range of frequencies supported by the UE 115 with a single antenna module. The UE 115 may use the multi-band antenna module for communications on low band (LB) frequencies (e.g., 24-29.5 GHZ), mid band (MB) frequencies (e.g., 37-43.5 GHZ), and high band (HB) frequencies (e.g., 47.2-48.2 GHz). The antenna elements of the multi-band antenna module in LB, MB, and HB may have the same physical antenna element separation, however, the inter-antenna element spacing may increase as the frequency increases. For example, the UE 115 may define the inter-antenna element spacing as $d=\alpha\lambda$ at a first carrier frequency $f_1$, and the inter-antenna element paving may as $$d=\left(\frac{af_2}{f_1}\right)\lambda,$$

at a second carrier frequency $f_2$, where $\lambda$ is wavelength and a is a coefficient. Thus, the inter-antenna element spacing may be represented by d and may be measured in fractions of wavelength (e.g., $\lambda$). As such, if $f_2>f_1$ (e.g., if the second carrier frequency is at a higher frequency than the first carrier frequency), the inter-antenna element spacing at $f_2$ may be relatively larger (e.g., in fractions of A) than the inter-antenna element spacing at $f_1$. For example, if an LB spacing is approximately equal to half a wavelength (e.g., $\lambda/2$), then a HB spacing may be approximately equal to a single wavelength (e.g., $\lambda$). However, as the inter-antenna element spacings increase, a directional beam of a UE 115 may generate increased side lobes or grating lobes depending on the direction the UE 115 scans, which may cause interference for communications at other UEs 115.

A directional beam from a UE 115 during beamforming may have a radiation pattern including a main lobe and one or more side lobes or grating lobes. A grating lobe may be an example of a side lobe with respect to the main lobe which may appear at higher inter-antenna element spacings such as spacings larger than half a wavelength (e.g., $\lambda/2$). For example, for a beam steered (e.g., pointed) at $\theta_0$ (e.g., assuming boresight angle $\theta_0=90°$), grating lobes may appear if $$d>\frac{\lambda}{1+|\cos(\theta_0)|}.$$

Thus, for angles closer to boresight (e.g., $\theta_0=90°$) grating lobes may not appear (e.g., depending on $d/\lambda$). In some examples, an antenna array with approximately a spacing of $\lambda/2$ may cover a negative 60° to a positive 60° scan range with some loss in performance due to drop in elemental gain. However, as the frequency which the UE 115 may use increases, the inter-antenna element spacings may increase (e.g., relative to wavelength), thus generating grating lobes which may cause interference in the wireless communication system. In some cases, a grating lobe may have a relatively large amplitude compared to the other side lobes and may be close to the amplitude of the main lobe. As such, the grating lobe may cause interference with other wireless devices (e.g., other UEs 115) and without avoiding the grating lobes, the wireless communication system may suffer from increased uplink interference.

For example, a UE 115 may contain a 16×1 linear antenna array with an inter-antenna element spacing of d, which may be a multi-band antenna module. The antenna array gain diagram 200 illustrates multiple directional beams at the same steering angle (e.g., −60° and at different inter-antenna element spacings. The lines illustrated in the antenna array gain diagram 200 may be representations of the directional beams at different inter-antenna element spacings, thus the different directional beams may be referred to as the beam 205 (e.g., illustrated as the solid line), the beam 210 (e.g., illustrated as the dashed line), and the beam 215 (e.g., illustrated as the dotted line) respectively. The parabolas of the illustrated lines (e.g., beams) in the antenna array gain diagram 200 may be lobes of the directional beams. For example, the beam 205 may have a main lobe 220 and a side lobe 225, the beam 210 may have a main lobe 230 and a side lobe 235, and the beam 215 may have a main lobe 240 and a side lobe 245. Further, as illustrated in the antenna array gain diagram 200, the beam 205 may have an inter-antenna element spacing of $d=0.5\lambda$, the beam 210 may have an inter-antenna element spacing of $d=0.75\lambda$, and the beam 215 may have an inter-antenna element spacing of $d=\lambda$. In the antenna array gain diagram 200, grating lobes may appear if the inter-antenna element spacing is above a spacing threshold of $0.6667\lambda$ (e.g., when $d>0.667\lambda$). Thus, as the inter-antenna element spacing increases between the directional beams (e.g., beam 205, beam 210, and beam 215) from $0.5\lambda$ to $0.75\lambda$ and to A respectively, the directional beams may begin to produce grating lobes.

In some cases, as the beam 205 inter-antenna element spacing may be below the spacing threshold (e.g., $d=0.5\lambda<0.6667\lambda$), the side lobe 225 may not be a grating lobe and may not interfere with communications from the UE 115 using the main lobe 240. In such cases, UE 115 may use the main lobe 240 to communicate with other wireless devices such as the network entity 105 or other UEs 115 and the side lobe 225 may not cause or generate interference in the wireless communication system. In some other cases, as the beam 210 inter-antenna element spacing may be above the spacing threshold (e.g., d=0.75λ>0.6667λ), the side lobe 235 may be a grating lobe. A grating lobe may be an example of a side lobe with a comparable amplitude as the main lobe and therefore may be referred to as a side lobe or a grating lobe herein. Further, the beam 215 inter-antenna element spacing may also be above the spacing threshold (e.g., d=λ>0.6667λ) and the side lobe 245 may also be a grating lobe.

As shown by the antenna array gain diagram 200, there may be some characteristics of the directional beams (e.g., the beam 205, the beam 210, and the beam 215) that may change as the frequency and the inter-antenna element spacing increases. For example, as shown, as the frequency increases, the main lobe of the beam (e.g., main lobe 220, main lobe 230, or main lobe 240) may move so that the peak of the main lobe (e.g., the peak gain direction) may point in an undesired direction. For the beam 210, the UE 115 may steer the main lobe 220 to point towards −60°, however as the beam 210 may be operating on a higher frequency band than the beam 205, the main lobe 230 may point in a direction slightly off from the desired direction (e.g., −40°. Further, as grating lobes (e.g., side lobe 225 and side lobe 235) appear, the gain differential between the main lobe and the side lobe may become smaller. For example, the beam 210 may have a gain differential 250 between the main lobe 230 and the side lobe 235. The beam 210 gain differential 250 may have a relatively low differential (e.g., about one dB) compared to the beam 205 gain differential between the main lobe 220 and the side lobe 225 (e.g., about 13 dB). As the beam 210 gain differential 250 may be relatively low and the side lobe 235 gain may be close to the gain of the main lobe 230, the side lobe 235 may cause interference with other wireless devices (e.g., the side lobe 235 may be a grating lobe).

For example, a wireless device (e.g., a UE 115) within the cell may receive a message from the side lobe 235 which may interfere with communications. Additionally, or alternatively, the main lobe 230 and the side lobe 235 may be separated by a distance 255. As the distance 255 between the main lobe 230 and the side lobe 235 increases, the chance or likelihood that the side lobe 235 may interfere with another wireless device may increase. For example, if the distance between a grating lobe and a main lobe is relatively low and the two lobes point in the same direction, both lobes may point in the direction desired by the UE 115 and may not cause interference. However, if the distance between the grating lobe and the main lobe is relatively high (e.g., the distance 255), the grating lobe may point in a different direction than the main lobe and therefore may not point in the direction of the communications. That is, if the side lobe 235 points in a different direction than the main lobe 230, the main lobe 230 may point towards the wireless device in communication with the UE 115 and the grating lobe (e.g., the side lobe 235) may point in a direction of a different wireless device not in communication with the wireless device and may interfere with the other wireless device.

As such, the techniques of the present disclosure may support the network entity 105 or other UEs 115 transmitting an indication that a UE 115 may be interfering with communications due to grating lobes. In response, the network entity 105 may transmit signaling to reduce or mitigate the impact of the grating lobes from the interfering UE 115. Such techniques and signaling may be further described elsewhere herein, including with reference to FIG. 3

Figure 3:
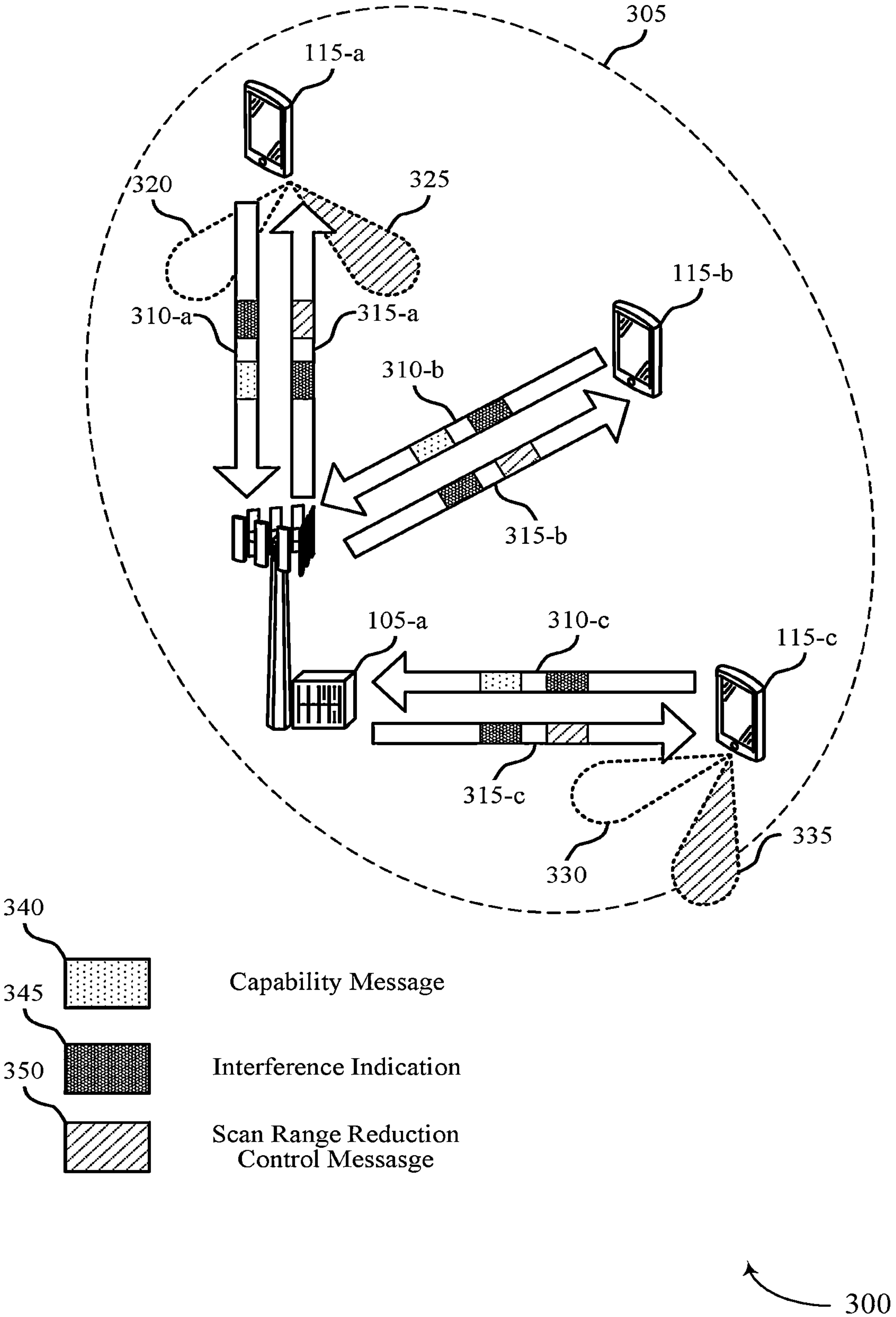
FIG. 3 illustrates an example of a wireless communication system that supports scan range modification with adaptive frequency band usage for multi-band antenna panels in accordance with one or more aspects of the present disclosure.

FIG. 3 illustrates an example of a wireless communication system 300 that supports scan range modification with adaptive frequency band usage for multi-band antenna panels in accordance with one or more aspects of the present disclosure. In some examples, the wireless communication system 300 may implement or be implemented by the wireless communication system 100. For example, the wireless communications system 300 may include a UE 115-*a*, a UE 115-*b*, a UE 115-*c*, a network entity 105-*a*, and a coverage area 305 which may represent examples of corresponding devices described herein. The UE 115-*a* may have a main lobe 320 and a side lobe 325 and the UE 115-*c* may have a main lobe 330 and a side lobe 325. In this example, the UEs 115 may communicate and exchange signaling with the network entity 105-*a* using a downlink communication link 310 (e.g., a downlink communication link 310-*a*, a downlink communication link 310-*b*, and a downlink communication link 310-*c*) and an uplink communication link 315 (e.g., an uplink communication link 315-*a*, an uplink communication link 315-*b*, and an uplink communication link 315-*c*). In some examples, the downlink communication links 310 and uplink communication links 315 may be an example of Uu links, sidelinks, backhaul links, or some other type of communication links.

In some examples of the wireless communication system 300, the UE 115-*a* and the UE 115-*c* may use a multi-band antenna module. A multi-band antenna module may be an antenna module with the capability of performing beamforming operation on a wide range of frequencies. As such, the UE 115-*a* and the UE 115-*c* may use the multi-band antenna module to support power savings and reduce complexity at the UE 115. For example, the multi-band antenna module may be less complex and power consuming than multiple antenna modules for the wide range of frequencies.

As the multi-band antenna module may provide additional communication opportunities and capabilities than a single band antenna module, the UEs 115 may transmit a capability message 340 to the network entity 105 indicating whether the respective UE 115 is using a multi-band antenna module. As such, the UE 115-*a* and the UE 115-*c* may indicate the use of a multi-band antenna module and the UE 115-*b* may indicate the use of a single-band antenna module. The capability message 340 may also indicate a list or range of frequencies supported by the respective UE 115. For example, the UE 115-*a* and the UE 115-*c* capability messages may indicate that the UE 115-*a* and the UE 115-*c* are capable of operating using frequency bands in FR2 and the capability from the UE 115-*b* may indicate the support for the frequency bands in frequency range one (FR1).

In some examples, as the UE 115-*a* and the UE 115-*c* may operate in higher frequency ranges, the UE 115-*a* and the UE 115-*c* may generate grating lobes (e.g., a side lobe 325 or a side lobe 335) as described with reference to FIG. 2. In such examples, the side lobe 325 and the side lobe 335 may be examples of grating lobes and may interfere with other UEs 115 within the coverage area 305 of the cell of the network entity 105-*a* or may cause interference across neighboring cells. In some cases, the side lobe 325 from the UE 115-*a* may point towards the UE 115-*c* and may cause interference for the UE 115-*c*. In some cases, the UE 115-*a* may operate on a frequency band that the UE 115-*c* may not support, as such UE 115-*a* may not cause any uplink interference. However, if both the UE 115-*a* and the UE 115-*c* have the same capabilities or the UE 115-*c* has the capability to operate on the same frequency band as the UE 115-*a*, the UE 115-*a* may cause interference with the UE 115-*c*. In some examples, the UE 115-*a* side lobe 325 may also cause interference with the UE 115-*b* or other UEs 115 within the cell of the network entity 105-*a*. Additionally, or alternatively, as the UE 115-*c* has the capability of operating on higher frequency bands, the UE 115-*c* may also cause interference with other UEs 115. However, the direction of the UE 115-*c* side lobe 335 may not point towards any other UEs 115 and the UE 115-*c* may not cause any sort of interference within the coverage area 305.

In some cases, the UE 115-*c* may be a low mobility UE 115 (e.g., a customer premises equipment (CPE)). As such, if the UE 115-*a* side lobe 325 interferes with the UE 115-*c*, the UE 115-*c* may not be able move out of the range of interference and the UE 115-*c* may pause transmissions until the interference has stopped. In such cases, the UE 115-*c* may refrain from transmitting uplink transmissions when the UE 115-*a* is transmitting uplink transmissions, as the side lobe 325 may cause interference and reduce the reliability and accuracy of uplink transmissions from the UE 115-*c*. Thus, the UE 115-*c* may wait until the UE 115-*a* has stopped transmitting uplink transmissions to transmit any uplink data to the network entity 105. However, if the UE 115-*c* refrains from transmitting uplink transmissions due to the interference from the UE 115-*a*, the wireless communication system 300 may have an increase in latency and delay.

As such, to support reducing or mitigating the interference impact of grating lobes (e.g., side lobe 325 and side lobe 335) in the wireless communication system 300, the network entity 105-*a* may transmit a scan range reduction control message 350 to the interfering UE(s) 115. In cases where the UE 115-*c* may detect interference from the UE 115-*a* via the side lobe 325, the UE 115-*c* may transmit an interference indication message 345 to the network entity 105-*a*. In some cases, the UE 115-*c* may not know where the interference is coming from and the interference indication message 345 may simply indicate that the UE 115-*c* is receiving interference from a neighboring UE 115. In some other cases, the UE 115-*c* may know which UE 115 may be causing the interference or the direction of the interfering device (e.g., the UE 115-*a*). As such, the interference indication message 345 may indicate a specific device that associated with the interference or the direction of the interfering device. In such cases, if another UE 115 is receiving interference, the UE 115 may transmit the interference indication message 345 to the network entity 105-*a*. That is, the UE 115-*a*, the UE 115-*b*, or the UE 115-*c* may transmit the interference indication message 345 if the respective UE 115 detects an interference.

In some examples, the network entity 105-*a* may determine that a UE 115 may interfere with other UEs 115. For example, the network entity 105-*a* may determine based on the capability of the UE 115-*a* and the capability of the other UEs 115 within the coverage area 305 that the UE 115-*a* may interfere with the UE 115-*c*. Additionally, or alternatively, the network entity 105-*a* may determine that the UE 115-*a* may interfere with other UEs 115 based on previous transmission history. For example, the network entity 105-*a* may determine that the UE 115-*a* may interfere with the UE 115-*c* based on both UEs 115 using the same frequency band and the positions of the UE 115-*a* and the UE 115-*c*. In some cases, the network entity may predict where the side lobe 325 of the UE 115-*a* may point and based on such predictions and may predict that the side lobe 325 may interfere with the UE 115-*c* or other UEs 115.

In some cases, the network entity 105 may identify the interference based on the capability message 340, the transmission configuration indicator (TCI) state indication from all UEs 115 within the coverage area 305, or based on communications with neighboring cells and neighboring network entities 105 or transmission reception points (TRPs). In such cases, the network entity 105-*a* may predict which UE 115 may interfere with other UEs 115, the direction of the interfering UE 115, or the capability of the interfering UE 115. As such, in some examples, the network entity 105-*a* may transmit the interference indication message 345 to a UE 115 that may experience interference. The interference indication message 345 may indicate for the UE 115 to move to prevent, or avoid, the interference without changing the parameters of the interfering UE 115. However, if the UE 115 is a low mobility UE 115 (e.g., UE 115-*b*) and is unable to move, the network entity 105-*a* may transmit a control message to the interfering UE 115 to reduce or mitigate the interference. In such cases, a UE 115 that may be unable to move away from the interference may transmit a message to the network entity 105-*a* with such information.

In response to the interference indication message 345 or based on determining the presence of an interfering UE 115, the network entity 105-*a* may transmit the scan range reduction control message 350. The scan range reduction control message 350 may indicate a set of frequencies that a UE 115 may operate on to avoid interfering with other UEs 115. For example, the scan range reduction control message 350 may indicate a set of frequencies that may not produce grating lobes (e.g., the inter-antenna element spacing may be below a threshold value or $\lambda/2$).

In some cases, if the network entity 105-*a* does not know one or more characteristics of the interfering UE 115 (e.g., the UE 115-*a*), the network entity 105-*a* may broadcast the scan range reduction control message 350 to the UEs 115 within the coverage area 305. As such, the UE 115-*a*, the UE 115-*b*, and the UE 115-*c* may receive the scan range reduction control message 350 and each respective UE 115 may perform a scan range reduction (e.g., reduce the set of frequencies available for wireless communications). In some cases, if the UE 115-*c* transmits the interference indication message and receives the scan range reduction control message 350, the UE 115-*c* may refrain from performing a scan range reduction, or the UE 115-*c* may refrain from processing the scan range reduction control message 350. In some examples, if the network entity 105-*a* receives or determines some characteristics about the interfering UE 115, the network entity 105-*a* may tailor the scan range reduction control message 350 to match such characteristics. For example, the UE 115-*c* may indicate via the interference indication message 345 where the interfering UE 115 is located or which UE 115 within the coverage area 305 is the interfering UE 115. If the UE 115-*c* indicates where the interfering UE 115 is located, the network entity 105-*a* may broadcast the scan range reduction control message 350 within the indicated area. In some cases, if the interference indication message 345 indicates any information about the interfering UE 115 (e.g., device identifier (ID), precise location, device capability), the network entity 105-*a* may transmit the scan range reduction control message 350 to that UE 115 alone (e.g., the UE 115-*a*) or to a group of UEs 115 (e.g., all UEs 115 using a multi-band antenna module).

As described, if the UE 115-*c* indicates information about the interference via the interference indication message 345, the network entity 105-*a* may transmit the scan range reduction control message 350 to a specific group of UEs 115. For example, the network entity 105-*a* may determine that the interfering UE 115 supports a multi-band antenna module based on the interference indication message 345 or the capability messages 340. As such, the network entity 105-*a* may transmit the scan range reduction control message 350 to the UE 115-*a* and the UE 115-*c*. Even though the UE 115-*c* may not be interfering with UEs 115 within the cell, if the network entity 105-*a* is unable to determine which UE 115 is the interfering UE 115, the network entity 105-*a* may transmit the scan range reduction control message 350 to all UEs 115 fitting the determined criteria to be the interfering UE 115. In some other examples, the network entity 105-*a* may determine which frequencies may cause the interference and may broadcast the scan range reduction control message 350 to UEs 115 that may be operating or have the capability of operating on such frequencies.

In some cases, a UE 115 may determine to perform a beam change rather than reduce the scan range of a beam. For example, the UE 115-*a* may determine that if the UE 115-*a* reduces the scan range of the current beam (e.g., including the main lobe 320 and the grating lobe 325), the accuracy and reliability of the current beam may be inefficient for communications. As such, the UE 115-*a* may instead initiate a beam change procedure to a different beam with a different TCI state that may reduce the interference in the wireless communication system 300. That is, the UE 115-*a* may change from a first beam (e.g., interfering beam) to a second beam that may not interfere with the UE 115-*b*, the UE 115-*c*, or any other wireless devices within the coverage area 305. In some cases, if the UE 115-*a* determines that a reduction in the scan range of the current beam may result in inefficient and inaccurate communications, the UE 115-*a* may report a beam failure for the current beam. As such, the UE 115-*a* may signal to the network entity 105-*a* a beam change signal indicating that the UE 115-*a* may change beams in response to the scan range reduction control message. The UE 115-*a* may then perform the beam change procedures to select a different beam that may not cause interference, or reduce the interference in the wireless communication system 300. In some other cases, the network entity 105-*a* may indicate for the UE 115-*a* to perform a beam change rather than reduce the scan range of the current beam. In some examples, if all beams of a set of beams at the UE 115-*a* may produce interference with other UEs 115, the UE 115-*a* may indicate a radio link failure and may refrain from transmitting data until the radio link is reestablished.

Such procedures and signaling may improve communications within the wireless communications system 300. For example, with reduced interference between wireless devices, wireless communications may be more efficient and accurate. In some cases, such procedures of mitigating interference may also increase decrease latency and delay in such devices. Further description of such procedures and signaling may be described elsewhere herein, including with reference to FIG. 4.

Figure 4:
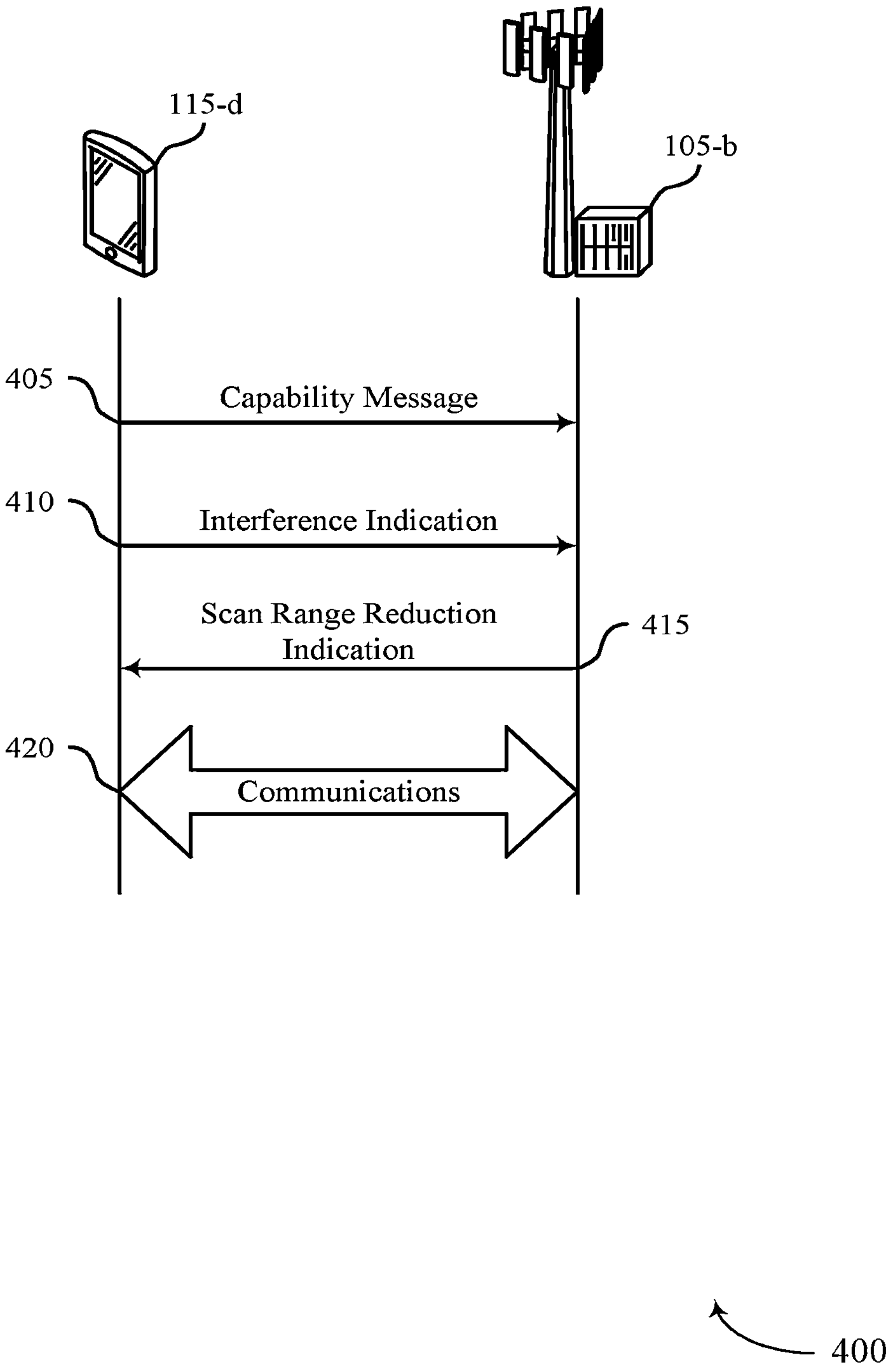
FIG. 4 illustrates an example of a process flow that supports scan range modification with adaptive frequency band usage for multi-band antenna panels in accordance with one or more aspects of the present disclosure.

FIG. 4 illustrates an example of a process flow 400 that supports scan range modification with adaptive frequency band usage for multi-band antenna panels in accordance with one or more aspects of the present disclosure. In some examples, the process flow 400 may implement or be implemented by the wireless communication system 100 or the wireless communication system 300. For example, the process flow 400 may include a UE 115-*d* and a network entity 105-*b*, which may represent examples of corresponding devices described herein. In this example, the UE 115-*d* may receive signaling instructing the UE 115-*d* to reduce a scan range of a beam to reduce interference between wireless devices.

In the following description of the process flow 400, the operations between the UE 115-*d* and the network entity 105-*b* may be performed in different orders or at different times. Some operations may also be left out of the process flow 400, or other operations may be added. Although the UE 115-*d* and the network entity 105-*b* are shown performing the operations of the process flow 400, some aspects of some operations may also be performed by one or more other wireless devices.

At 405, the UE 115-*d* may transmit a capability message to the network entity 105-*b* indicating that the UE 115-*d* may be capable of supporting a set of frequency bands for wireless communication with an antenna panel (e.g., a multi-band antenna module or panel). The UE 115-*d* may use the set of frequency bands for beamforming over a given beamforming scan range.

At 410, in some examples, the UE 115-*d* may transmit an interference indication message to the network entity 105-*b* indicating an interference between a set of UEs 115 including the UE 115-*d* caused by one or more grating lobes, one or more side lobes, or both related to the multi-band antenna panel. In some examples, the set of UEs 115 may be in a same cell or the set of UEs 115 spread out between a set of different cells. Additionally, or alternatively, the UE 115-*d* may transmit an indication of a TCI state that the UE 115-*d* is using. The UE 115-*d* may determine a portion or subset of the set of frequency bands based on the indication of the TCI state. In some cases, the UE 115-*d* may include the interference indication and the indication of the TCI state in the capability message at 405 or in a separate message.

In some other examples, the network entity 105-*b* may determine the interference between UEs 115 of the set of UEs 115 based on a UE 115 satisfying a threshold interference value. In some cases, the network entity 105-*b* may determine the interference by receiving a control message from the UE 115-*d* indicating the interference and comparing the indicated interference to the threshold interference value. In some other cases, the network entity 105-*b* may determine the interference by receiving respective indications of a TCI state for respective UEs 115 of the set of UEs 115. As such, the network entity 105-*b* may estimate the interference based on the capability message from the UE 115-*d* and the respective TCI states of the respective UEs 115. Further, the network entity 105-*b* may determine the interference satisfies the threshold interference value by comparing the estimated interference to the threshold interference value.

At 415, the UE 115-*d* may receive a first control message from the network entity 105-*b* in response to the capability message transmitted at 405 and based on the network entity 105-*b* determining the interference between the UEs 115 satisfies the threshold interference value. The first control message may indicate a portion or subset of the set of frequency bands to use for wireless communication and for the beamforming scan range. That is, the first control message may indicate for the UE 115-*d* to use a lower set of frequencies from the set of frequencies for the beamforming scan range due to the detected interference (e.g., a scan range reduction). In some cases, the beamforming scan range may be based at least on the indication of the TCI states of the set of UEs 115 including the TCI state of the UE 115-*d*. The first control message may also include an indication of a respective frequency band of the subset of frequency bands or a frequency range from the subset of frequency bands for use in further wireless communications. In some examples, the first control message may be a broadcast message to the set of UEs 115 or a subset of UEs 115 from the set of UEs 115. In some cases, the subset of UEs 115 may be UEs 115 with the same or similar capabilities or UEs 115 within the same geographical location or communication direction. In some other examples, the network entity 105-*b* may transmit the first control signaling to a specific UE 115 (e.g., the UE 115-*d*) or group of UEs 115 including the UE 115-*d* based on the determined interference.

In some cases, the UE 115-*d* may receive a second control message from the network entity 105-*b* indicating for the UE 115-*d* to switch from a first beam to a second beam. The second control message may indicate that the second beam may use a beamwidth within the beamforming scan range for the wireless communications based on the network entity 105-*b* transmitting the first control message. In some examples, using the second beam may result in a reduction in interference compared to the interference caused by the second beam. In some other cases, the UE 115-*d* may determine to perform the beam switch from the first beam to the second beam based on a determination that if the UE 115-*d* reduces the scan range of the first beam, the first beam may become inefficient and inaccurate for further wireless communications. As such, the UE 115-*d* may perform the beam switch to improve the efficiency and accuracy of communications and reduce the interference caused by the first beam. Additionally, or alternatively, the UE 115-*d* or the network entity 105-*b* may determine that the second beam may cause an equivalent amount of interference as the first beam, however, a scan range reduction of the second beam may not impact the efficiency and accuracy of communications. As such, the UE 115-*d* may switch to using the second beam and perform the scan range reduction on the second beam. In some examples, if no beams of a set of beams at the UE 115-*d* may result in a reduction of interference compared to the interference from the first beam, the UE 115-*d* may report a radio link failure or refrain from performing any communications (e.g., transmitting data). As such, the UE 115-*d* may wait until the radio link may be reestablished or for a period where the first beam or another beam may not cause interference with any neighboring UEs 115.

At 420, the UE 115-*d* may transmit wireless communications (e.g., at least a portion of wireless communications) via a frequency band of the subset of frequency bands based on the beamforming scan range indications at 415. As such, the UE 115-*d* may transmit further wireless communications via the frequency band until the UE 115-*d* finishes transmitting uplink data or another UE 115 or the network entity 105-*b* indicates that the UE 115-*d* may be causing interference using the frequency band.

Figure 5:
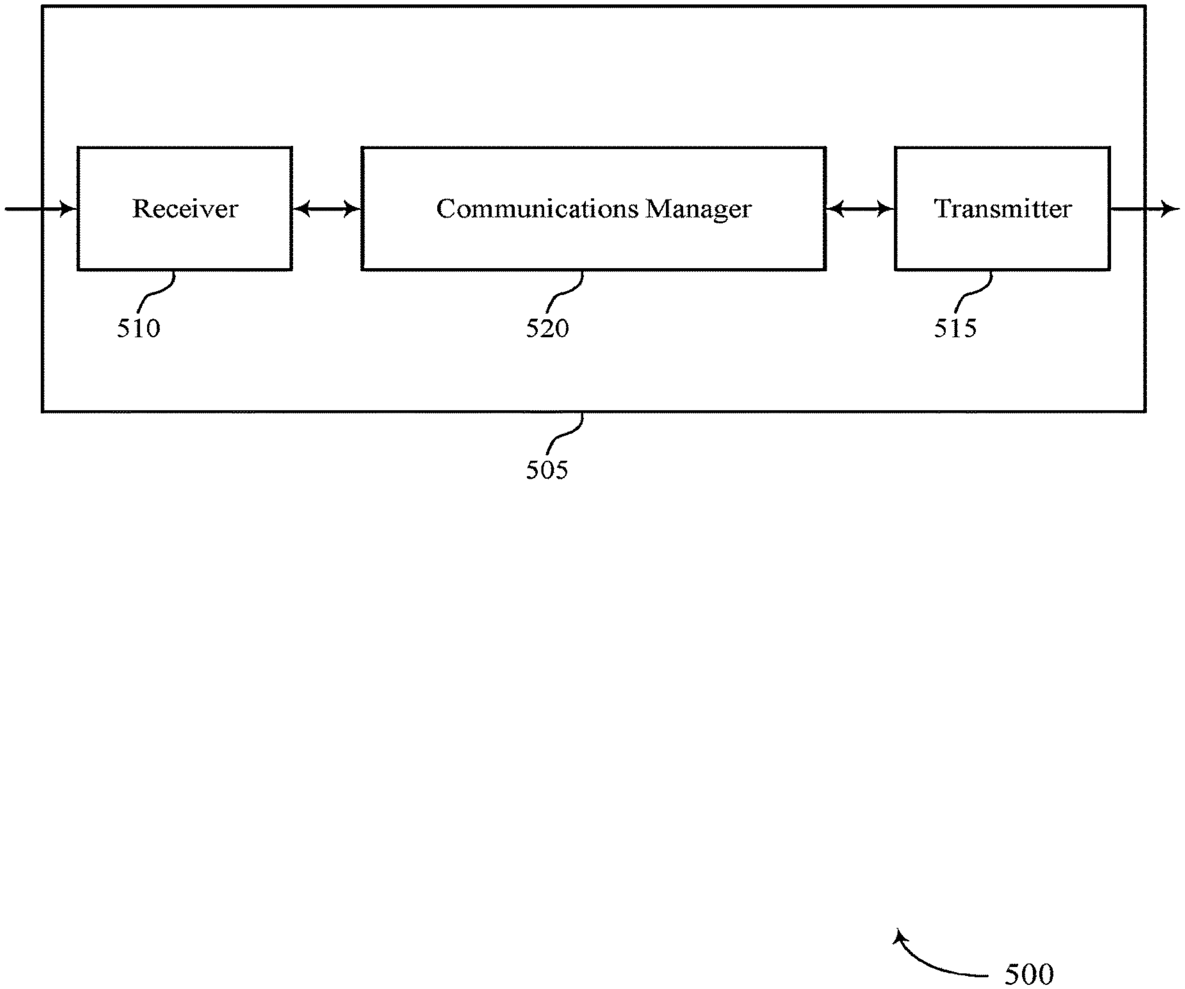
FIGS. 5 and 6 illustrate block diagrams of devices that support scan range modification with adaptive frequency band usage for multi-band antenna panels in accordance with one or more aspects of the present disclosure.

FIG. 5 illustrates a block diagram 500 of a device 505 that supports scan range modification with adaptive frequency band usage for multi-band antenna panels in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to scan range modification with adaptive frequency band usage for multi-band antenna panels). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to scan range modification with adaptive frequency band usage for multi-band antenna panels). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of scan range modification with adaptive frequency band usage for multi-band antenna panels as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a GPU an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for transmitting a capability message indicating a capability of the UE to support a set of multiple frequency bands for wireless communications with an antenna panel. The communications manager 520 may be configured as or otherwise support a means for receiving, based on the capability, a first control message indicating a portion of the set of multiple frequency bands to use for the wireless communications, the set of multiple frequency bands corresponding to a beamforming scan range. The communications manager 520 may be configured as or otherwise support a means for transmitting, based on the beamforming scan range, the wireless communications via a frequency band of the portion of the set of multiple frequency bands.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for a network entity 105 and a UE 115 reducing the interference between UEs 115 to support a more efficient utilization of communication resources and mor accurate communications.

Figure 6:
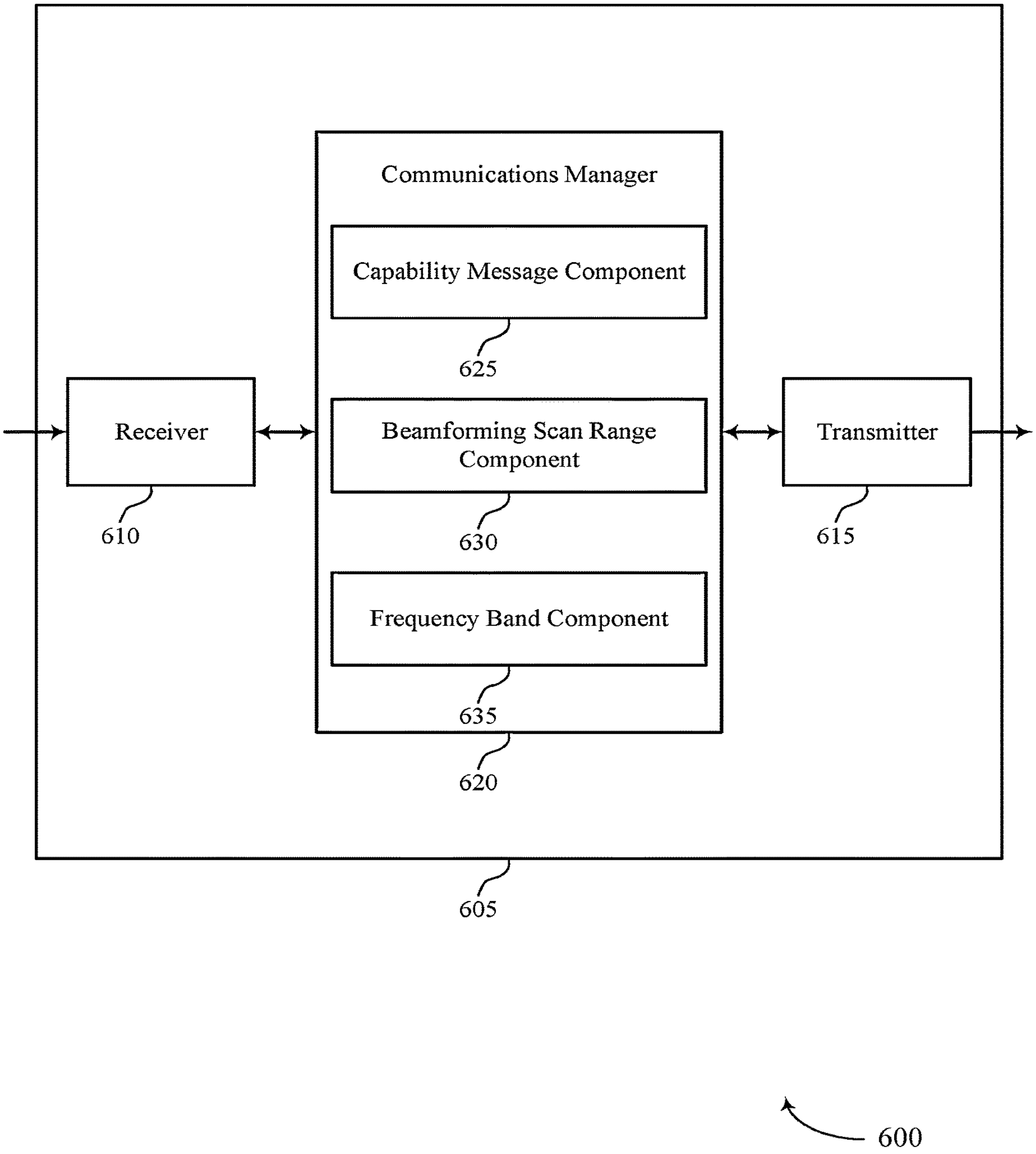

FIG. 6 illustrates a block diagram 600 of a device 605 that supports scan range modification with adaptive frequency band usage for multi-band antenna panels in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to scan range modification with adaptive frequency band usage for multi-band antenna panels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scan range modification with adaptive frequency band usage for multi-band antenna panels). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of scan range modification with adaptive frequency band usage for multi-band antenna panels as described herein. For example, the communications manager 620 may include a capability message component 625, a beamforming scan range component 630, a frequency band component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The capability message component 625 may be configured as or otherwise support a means for transmitting a capability message indicating a capability of the UE to support a set of multiple frequency bands for wireless communications with an antenna panel. The beamforming scan range component 630 may be configured as or otherwise support a means for receiving, based on the capability, a first control message indicating a portion of the set of multiple frequency bands to use for the wireless communications, the set of multiple frequency bands corresponding to a beamforming scan range. The frequency band component 635 may be configured as or otherwise support a means for transmitting, based on the beamforming scan range, the wireless communications via a frequency band of the portion of the set of multiple frequency bands.

Figure 7:
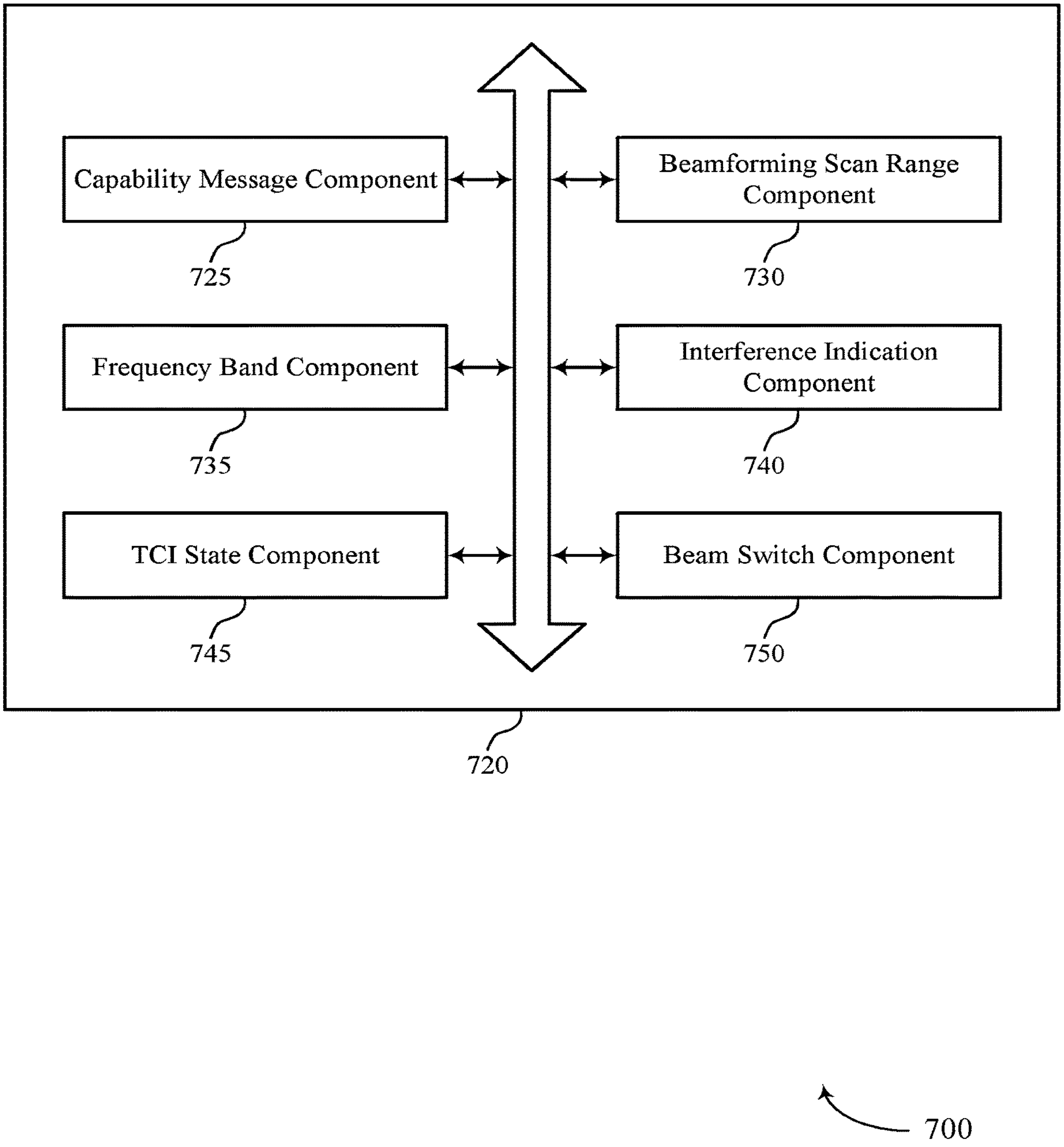
FIG. 7 illustrates a block diagram of a communications manager that supports scan range modification with adaptive frequency band usage for multi-band antenna panels in accordance with one or more aspects of the present disclosure.

FIG. 7 illustrates a block diagram 700 of a communications manager 720 that supports scan range modification with adaptive frequency band usage for multi-band antenna panels in accordance with one or more aspects of the present disclosure. The communications manager 720 may be an example of aspects of a communications manager 520, a communications manager 620, or both, as described herein. The communications manager 720, or various components thereof, may be an example of means for performing various aspects of scan range modification with adaptive frequency band usage for multi-band antenna panels as described herein. For example, the communications manager 720 may include a capability message component 725, a beamforming scan range component 730, a frequency band component 735, an interference indication component 740, a TCI state component 745, a beam switch component 750, or any combination thereof. Each of these components may communicate, directly or indirectly, with one another (e.g., via one or more buses).

The communications manager 720 may support wireless communication at a UE in accordance with examples as disclosed herein. The capability message component 725 may be configured as or otherwise support a means for transmitting a capability message indicating a capability of the UE to support a set of multiple frequency bands for wireless communications with an antenna panel. The beamforming scan range component 730 may be configured as or otherwise support a means for receiving, based on the capability, a first control message indicating a portion of the set of multiple frequency bands to use for the wireless communications, the set of multiple frequency bands corresponding to a beamforming scan range. The frequency band component 735 may be configured as or otherwise support a means for transmitting, based on the beamforming scan range, the wireless communications via a frequency band of the portion of the set of multiple frequency bands.

In some examples, the interference indication component 740 may be configured as or otherwise support a means for transmitting an indication of an interference between a set of multiple UEs including the UE in the capability message, the interference associated with one or more grating lobes, one or more side lobes, or both corresponding to the antenna panel.

In some examples, the set of multiple UEs are associated with a same cell.

In some examples, the set of multiple UEs are associated with a set of multiple different cells.

In some examples, the TCI state component 745 may be configured as or otherwise support a means for transmitting an indication of a TCI state corresponding to the UE, where the portion of the set of multiple frequency bands and the beamforming scan range is based on the indication of the TCI state corresponding to the UE.

In some examples, the beam switch component 750 may be configured as or otherwise support a means for receiving a second control message indicating for the UE to switch from a first beam to a second beam with a beamwidth within the beamforming scan range for transmitting the wireless communications based on receiving the first control message, where the second beam corresponds to a reduction in interference from the first beam.

In some examples, the first control message indicating the portion of the set of multiple frequency bands includes an indication of respective frequency bands of the portion of the set of multiple frequency bands.

In some examples, the first control message indicating the portion of the set of multiple frequency bands includes a frequency range including the portion of the set of multiple frequency bands.

In some examples, the first control message is a broadcast message to a set of multiple UEs including the UE.

Figure 8:
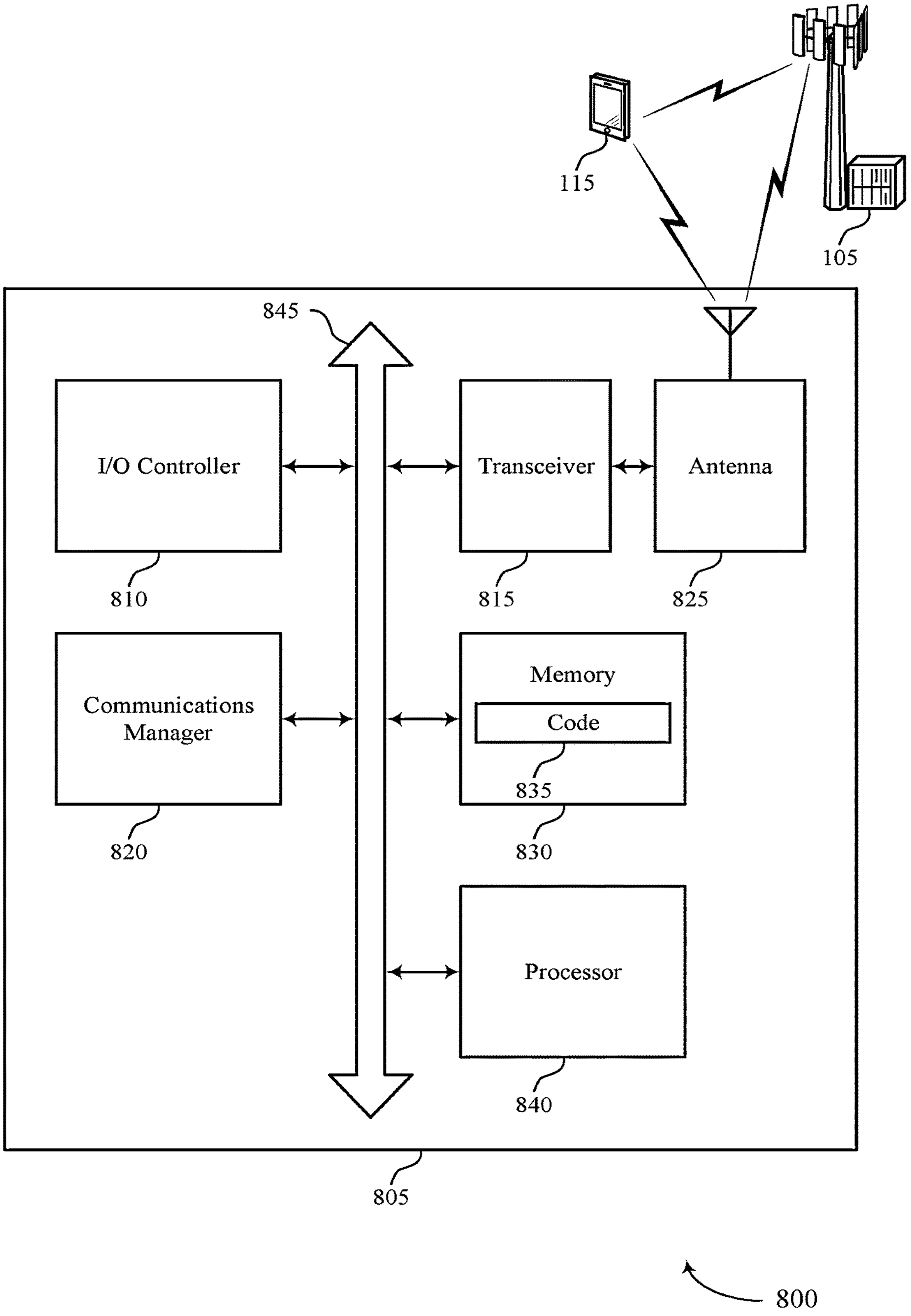
FIG. 8 illustrates a diagram of a system including a device that supports scan range modification with adaptive frequency band usage for multi-band antenna panels in accordance with one or more aspects of the present disclosure.

FIG. 8 illustrates a diagram of a system 800 including a device 805 that supports scan range modification with adaptive frequency band usage for multi-band antenna panels in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting scan range modification with adaptive frequency band usage for multi-band antenna panels). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting a capability message indicating a capability of the UE to support a set of multiple frequency bands for wireless communications with an antenna panel. The communications manager 820 may be configured as or otherwise support a means for receiving, based on the capability, a first control message indicating a portion of the set of multiple frequency bands to use for the wireless communications, the set of multiple frequency bands corresponding to a beamforming scan range. The communications manager 820 may be configured as or otherwise support a means for transmitting, based on the beamforming scan range, the wireless communications via a frequency band of the portion of the set of multiple frequency bands.

By including or configuring the communications manager 820 in accordance with examples as described herein, the device 805 may support techniques for a network entity 105 and a UE 115 reducing the interference between UEs 115 to support improved communication reliability, reduced latency, more efficient utilization of communication resources, and improved communication accuracy.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of scan range modification with adaptive frequency band usage for multi-band antenna panels as described herein, or the processor 840 and the memory 830 may be otherwise configured to perform or support such operations.

Figure 9:
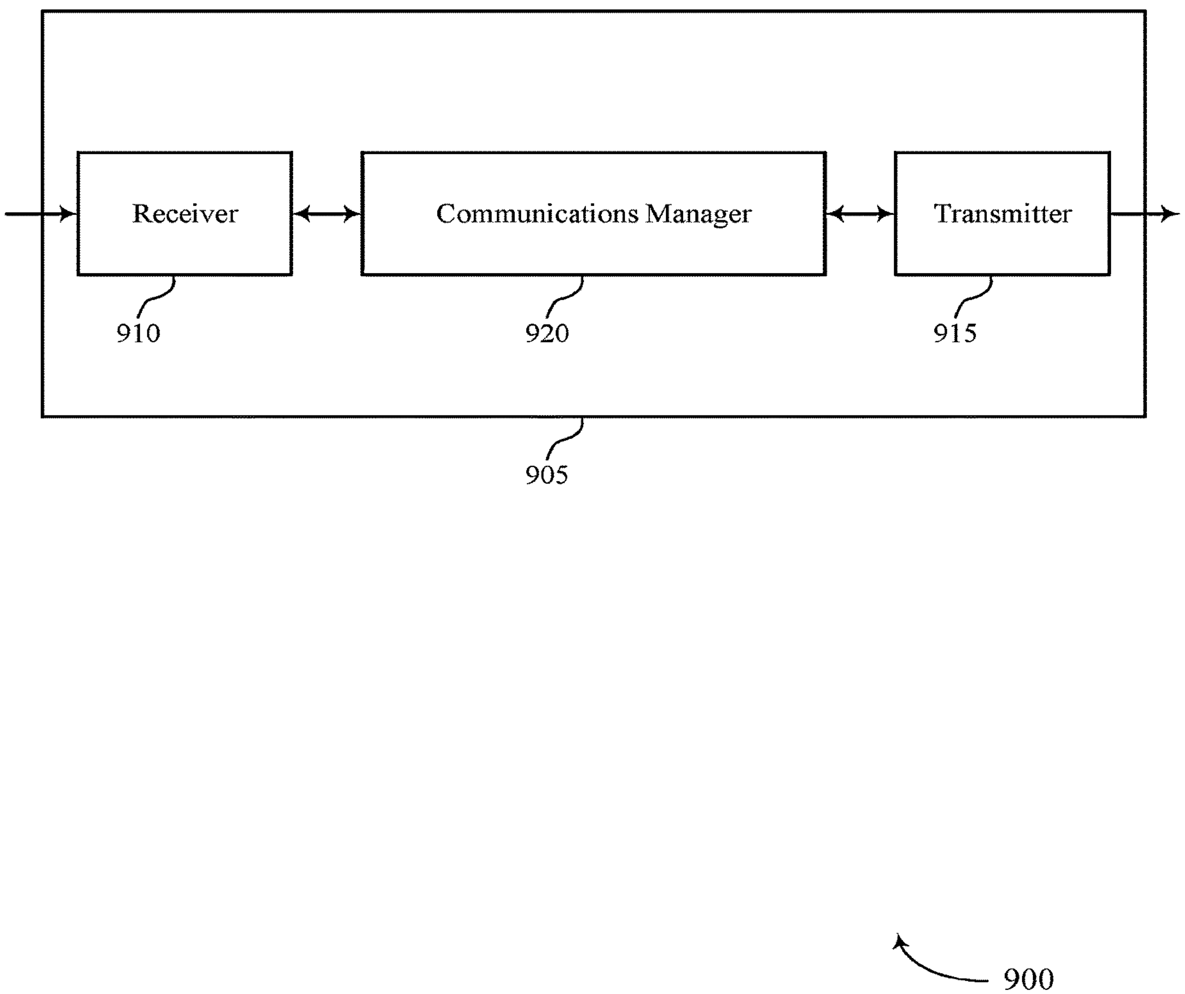
FIGS. 9 and 10 illustrate block diagrams of devices that support scan range modification with adaptive frequency band usage for multi-band antenna panels in accordance with one or more aspects of the present disclosure.

FIG. 9 illustrates a block diagram 900 of a device 905 that supports scan range modification with adaptive frequency band usage for multi-band antenna panels in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of scan range modification with adaptive frequency band usage for multi-band antenna panels as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU. an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for receiving a capability message indicating a capability of a UE to support a set of multiple frequency bands for wireless communications with an antenna panel. The communications manager 920 may be configured as or otherwise support a means for transmitting, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for a network entity 105 and a UE 115 reducing the interference between UEs 115 to support a more efficient utilization of communication resources and mor accurate communications.

Figure 10:
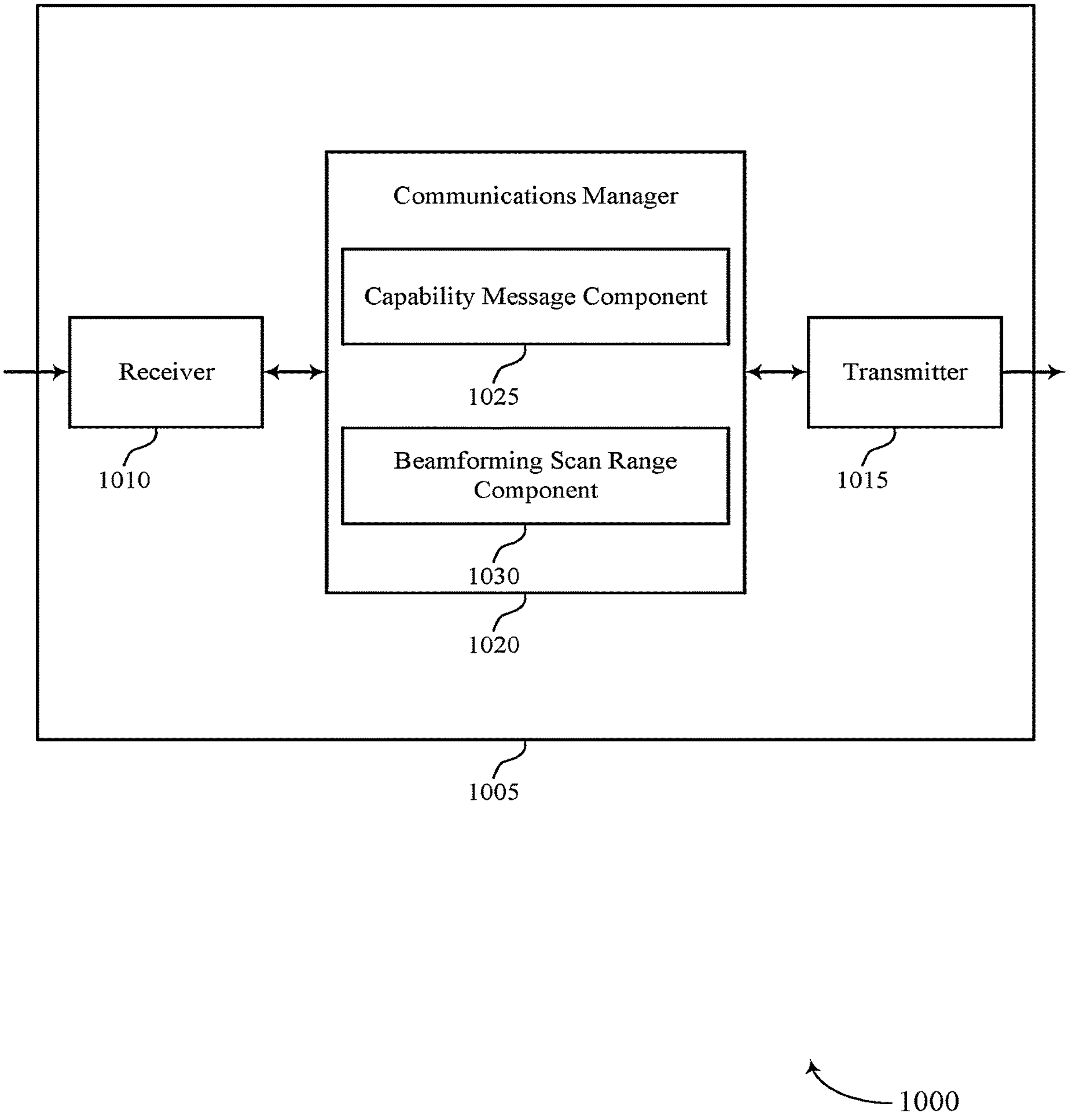

FIG. 10 illustrates a block diagram 1000 of a device 1005 that supports scan range modification with adaptive frequency band usage for multi-band antenna panels in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of scan range modification with adaptive frequency band usage for multi-band antenna panels as described herein. For example, the communications manager 1020 may include a capability message component 1025 a beamforming scan range component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The capability message component 1025 may be configured as or otherwise support a means for receiving a capability message indicating a capability of a UE to support a set of multiple frequency bands for wireless communications with an antenna panel. The beamforming scan range component 1030 may be configured as or otherwise support a means for transmitting, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

Figure 11:
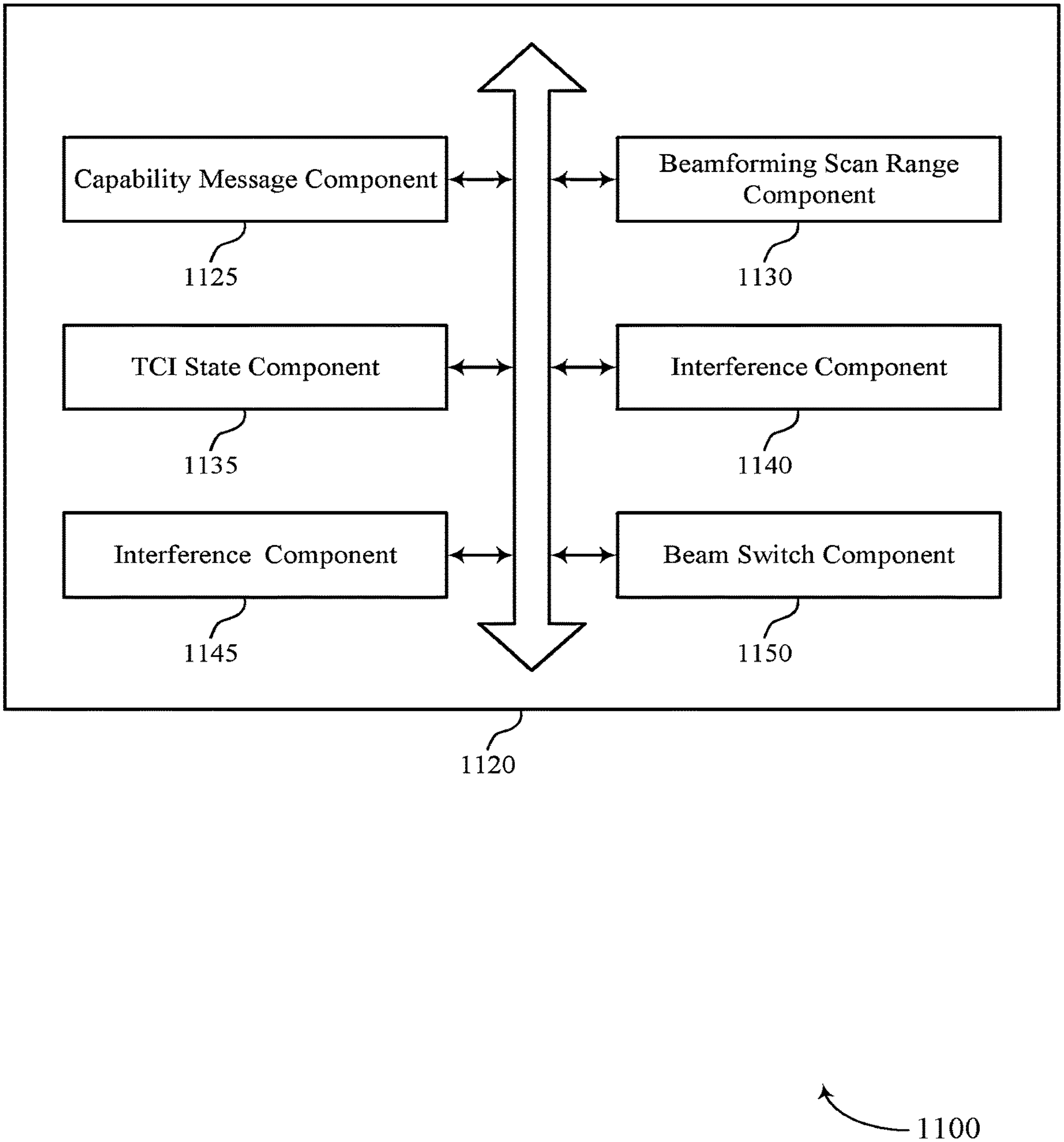
FIG. 11 illustrates a block diagram of a communications manager that supports scan range modification with adaptive frequency band usage for multi-band antenna panels in accordance with one or more aspects of the present disclosure.

FIG. 11 illustrates a block diagram 1100 of a communications manager 1120 that supports scan range modification with adaptive frequency band usage for multi-band antenna panels in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of scan range modification with adaptive frequency band usage for multi-band antenna panels as described herein. For example, the communications manager 1120 may include a capability message component 1125, a beamforming scan range component 1130, a TCI state component 1135, an interference component 1140, an interference component 1145, a beam switch component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The capability message component 1125 may be configured as or otherwise support a means for receiving a capability message indicating a capability of a UE to support a set of multiple frequency bands for wireless communications with an antenna panel. The beamforming scan range component 1130 may be configured as or otherwise support a means for transmitting, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

In some examples, to support determining the interference between the set of multiple UEs including the UE satisfies the threshold interference value, the TCI state component 1135 may be configured as or otherwise support a means for receiving respective indications of a TCI state corresponding to respective UEs of the set of multiple UEs. In some examples, to support determining the interference between the set of multiple UEs including the UE satisfies the threshold interference value, the interference component 1140 may be configured as or otherwise support a means for estimating the interference based on the capability message, the interference, and the respective indications of the TCI state corresponding to respective UEs. In some examples, to support determining the interference between the set of multiple UEs including the UE satisfies the threshold interference value, the interference component 1140 may be configured as or otherwise support a means for comparing the interference to the threshold interference value.

In some examples, the portion of the set of multiple frequency bands and the beamforming scan range is based on the respective indications of the TCI states corresponding to the set of multiple UEs.

In some examples, to support determining the interference between the set of multiple UEs including the UE satisfies the threshold interference value, the interference component 1145 may be configured as or otherwise support a means for receiving a second control message indicating the interference. In some examples, to support determining the interference between the set of multiple UEs including the UE satisfies the threshold interference value, the interference component 1140 may be configured as or otherwise support a means for comparing the interference to the threshold interference value.

In some examples, the beam switch component 1150 may be configured as or otherwise support a means for transmitting a second control message indicating for the UE to switch from a first beam to a second beam with a beamwidth within the beamforming scan range for the wireless communications based on transmitting the first control message, where the second beam corresponds to a reduction in interference from the first beam.

In some examples, the first control message indicating the portion of the set of multiple frequency bands includes an indication of respective frequency bands of the portion of the set of multiple frequency bands.

In some examples, the first control message indicating the portion of the set of multiple frequency bands includes a frequency range including the portion of the set of multiple frequency bands.

In some examples, the first control message is a broadcast message to the set of multiple UEs.

Figure 12:
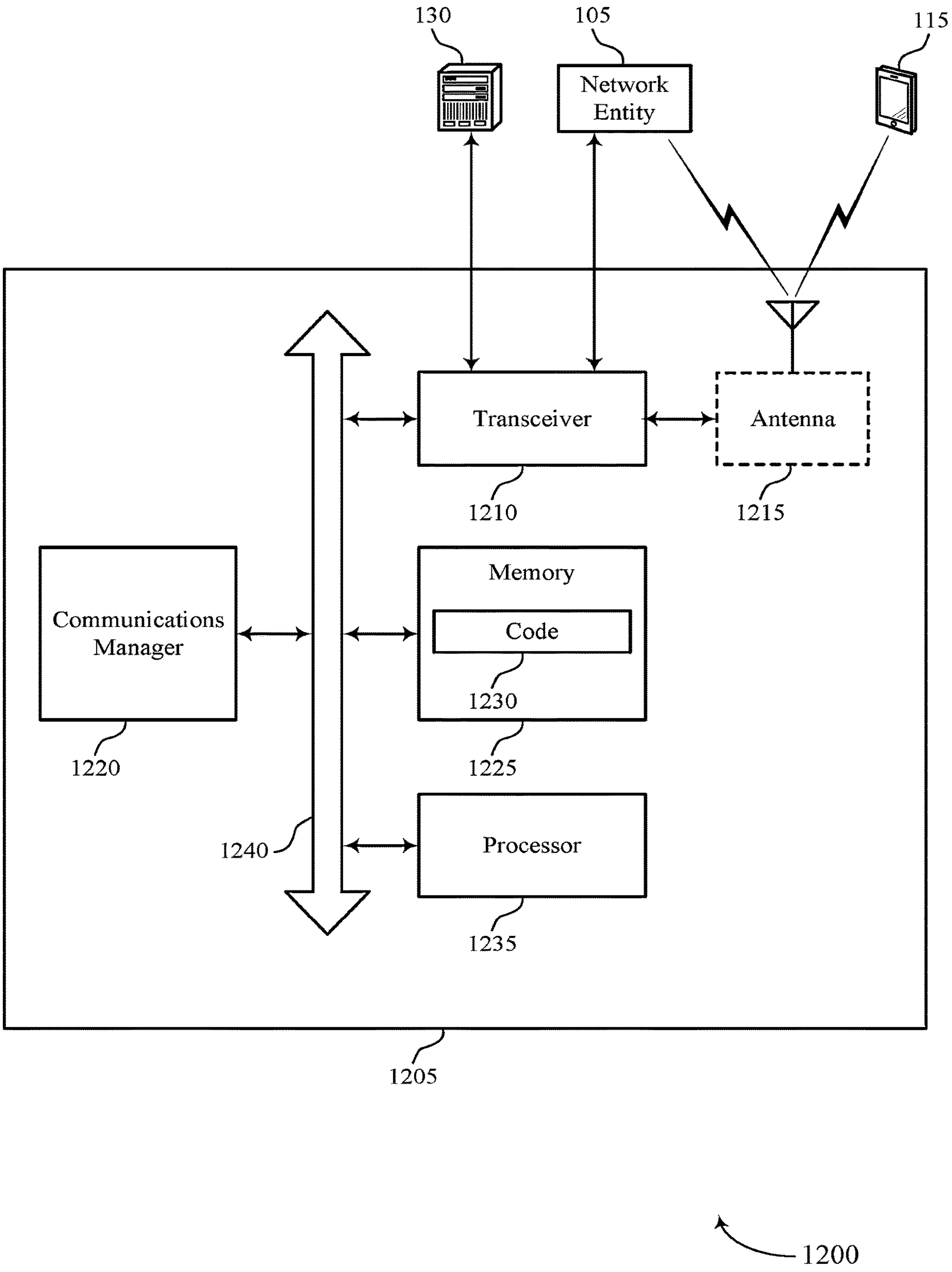
FIG. 12 illustrates a diagram of a system including a device that supports scan range modification with adaptive frequency band usage for multi-band antenna panels in accordance with one or more aspects of the present disclosure.

FIG. 12 illustrates a diagram of a system 1200 including a device 1205 that supports scan range modification with adaptive frequency band usage for multi-band antenna panels in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting scan range modification with adaptive frequency band usage for multi-band antenna panels). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for receiving a capability message indicating a capability of a UE to support a set of multiple frequency bands for wireless communications with an antenna panel. The communications manager 1220 may be configured as or otherwise support a means for transmitting, based on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range.

By including or configuring the communications manager 1220 in accordance with examples as described herein, the device 1205 may support techniques for a network entity 105 and a UE 115 reducing the interference between UEs 115 to support improved communication reliability, reduced latency, more efficient utilization of communication resources, and improved communication accuracy.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of scan range modification with adaptive frequency band usage for multi-band antenna panels as described herein, or the processor 1235 and the memory 1225 may be otherwise configured to perform or support such operations.

Figure 13:
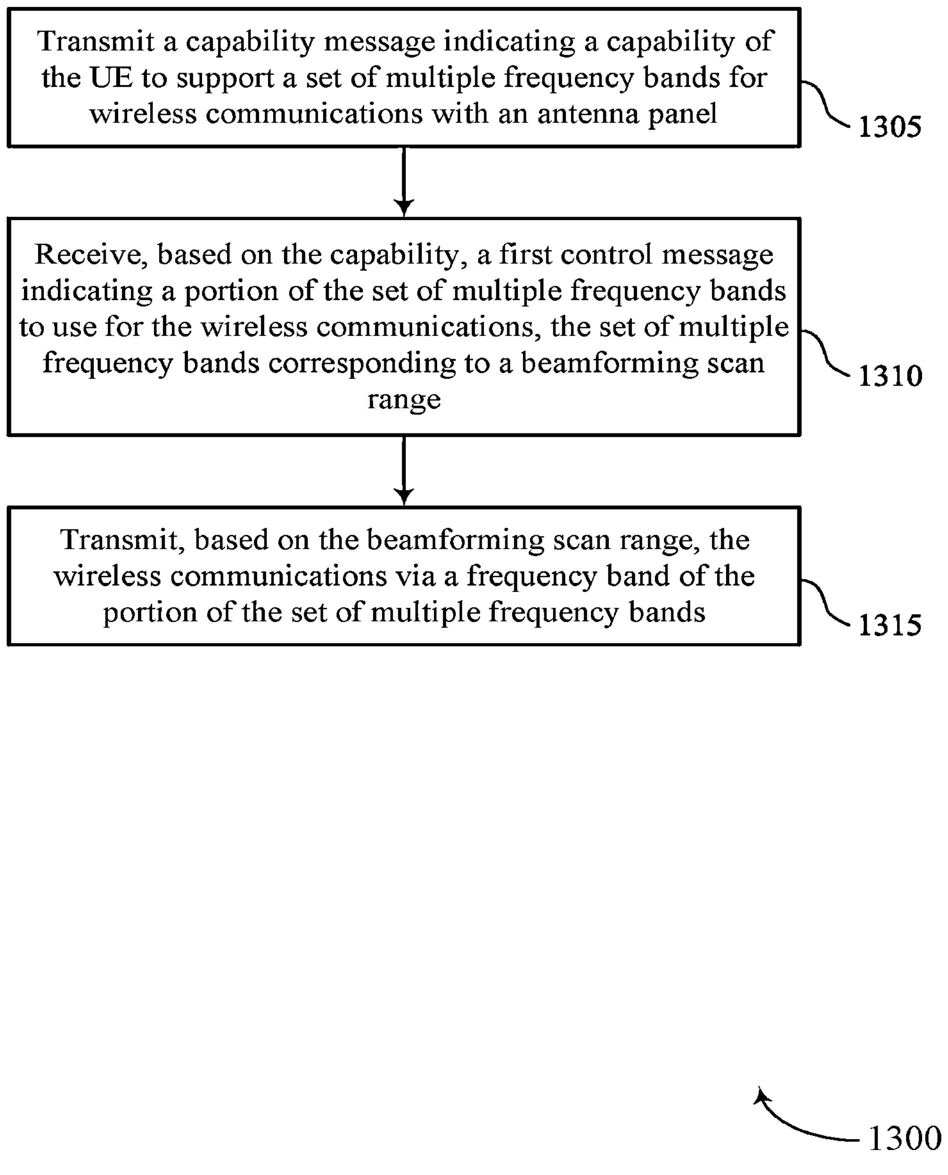

FIG. 13 illustrates a flowchart showing a method 1300 that supports scan range modification with adaptive frequency band usage for multi-band antenna panels in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a capability message indicating a capability of the UE to support a set of multiple frequency bands for wireless communications with an antenna panel. The operations of 1305 may be performed in accordance with examples as disclosed herein. In some examples, aspects of the operations of 1305 may be performed by a capability message component 725 as described with reference to FIG. 7.

At 1310, the method may include receiving, based at least in part on the capability, a first control message indicating a portion of the set of multiple frequency bands to use for the wireless communications, the set of multiple frequency bands corresponding to a beamforming scan range. The operations of 1310 may be performed in accordance with examples as disclosed herein. In some examples, aspects of the operations of 1310 may be performed by a beamforming scan range component 730 as described with reference to FIG. 7.

At 1315, the method may include transmitting, based at least in part on the beamforming scan range, the wireless communications (e.g., at least a portion of the wireless communications) via a frequency band of the portion of the set of multiple frequency bands. The operations of 1315 may be performed in accordance with examples as disclosed herein. In some examples, aspects of the operations of 1315 may be performed by a frequency band component 735 as described with reference to FIG. 7.

Figure 14:
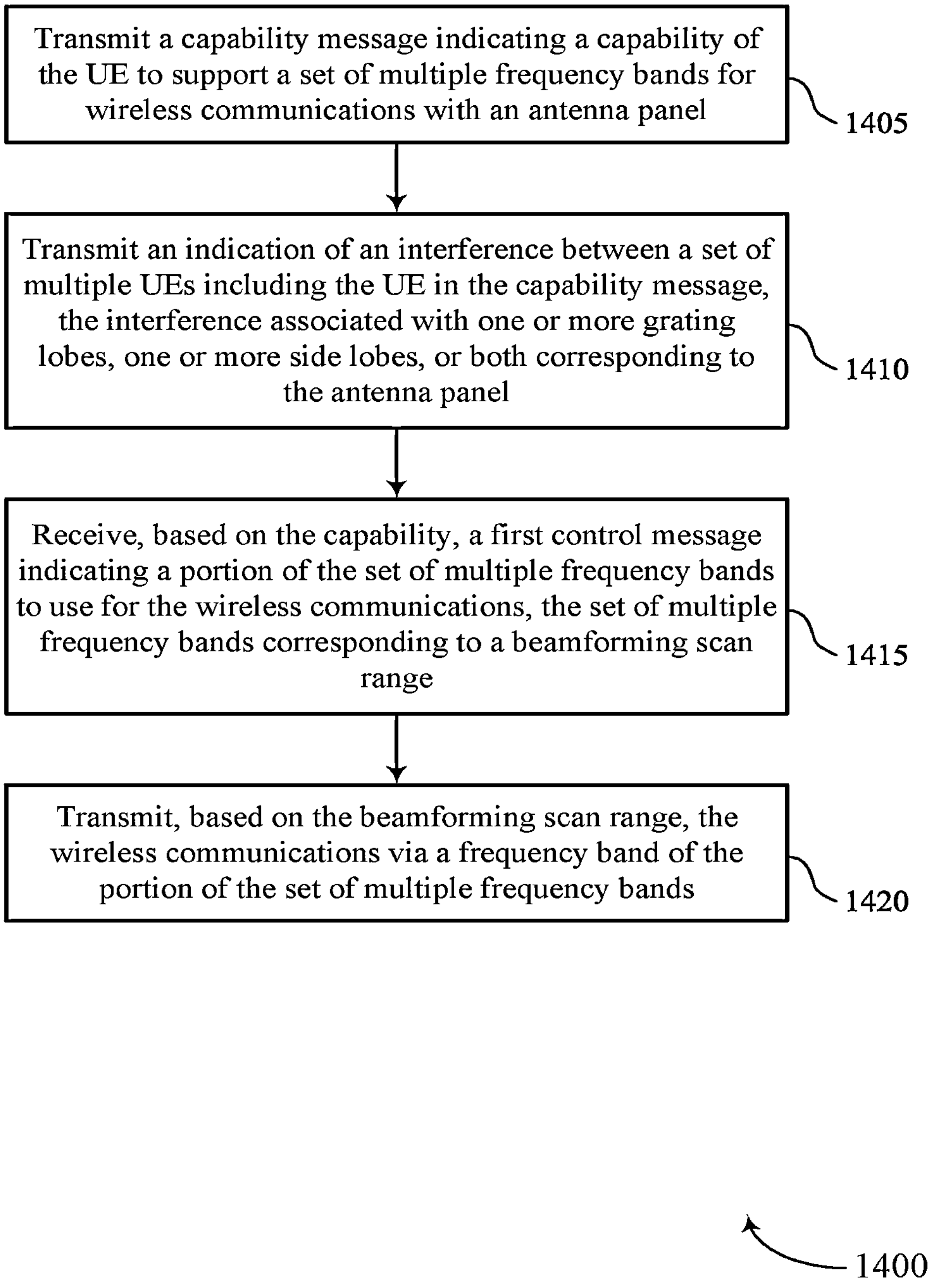

FIG. 14 illustrates a flowchart showing a method 1400 that supports scan range modification with adaptive frequency band usage for multi-band antenna panels in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message indicating a capability of the UE to support a set of multiple frequency bands for wireless communications with an antenna panel. The operations of 1405 may be performed in accordance with examples as disclosed herein. In some examples, aspects of the operations of 1405 may be performed by a capability message component 725 as described with reference to FIG. 7.

At 1410, the method may include transmitting an indication of an interference between a set of multiple UEs including the UE in the capability message, the interference associated with one or more grating lobes, one or more side lobes, or both corresponding to the antenna panel. The operations of 1410 may be performed in accordance with examples as disclosed herein. In some examples, aspects of the operations of 1410 may be performed by an interference indication component 740 as described with reference to FIG. 7.

At 1415, the method may include receiving, based at least in part on the capability, a first control message indicating a portion of the set of multiple frequency bands to use for the wireless communications, the set of multiple frequency bands corresponding to a beamforming scan range. The operations of 1415 may be performed in accordance with examples as disclosed herein. In some examples, aspects of the operations of 1415 may be performed by a beamforming scan range component 730 as described with reference to FIG. 7.

At 1420, the method may include transmitting, based at least in part on the beamforming scan range, the wireless communications (e.g., at least a portion of the wireless communications) via a frequency band of the portion of the set of multiple frequency bands. The operations of 1420 may be performed in accordance with examples as disclosed herein. In some examples, aspects of the operations of 1420 may be performed by a frequency band component 735 as described with reference to FIG. 7.

Figure 15:
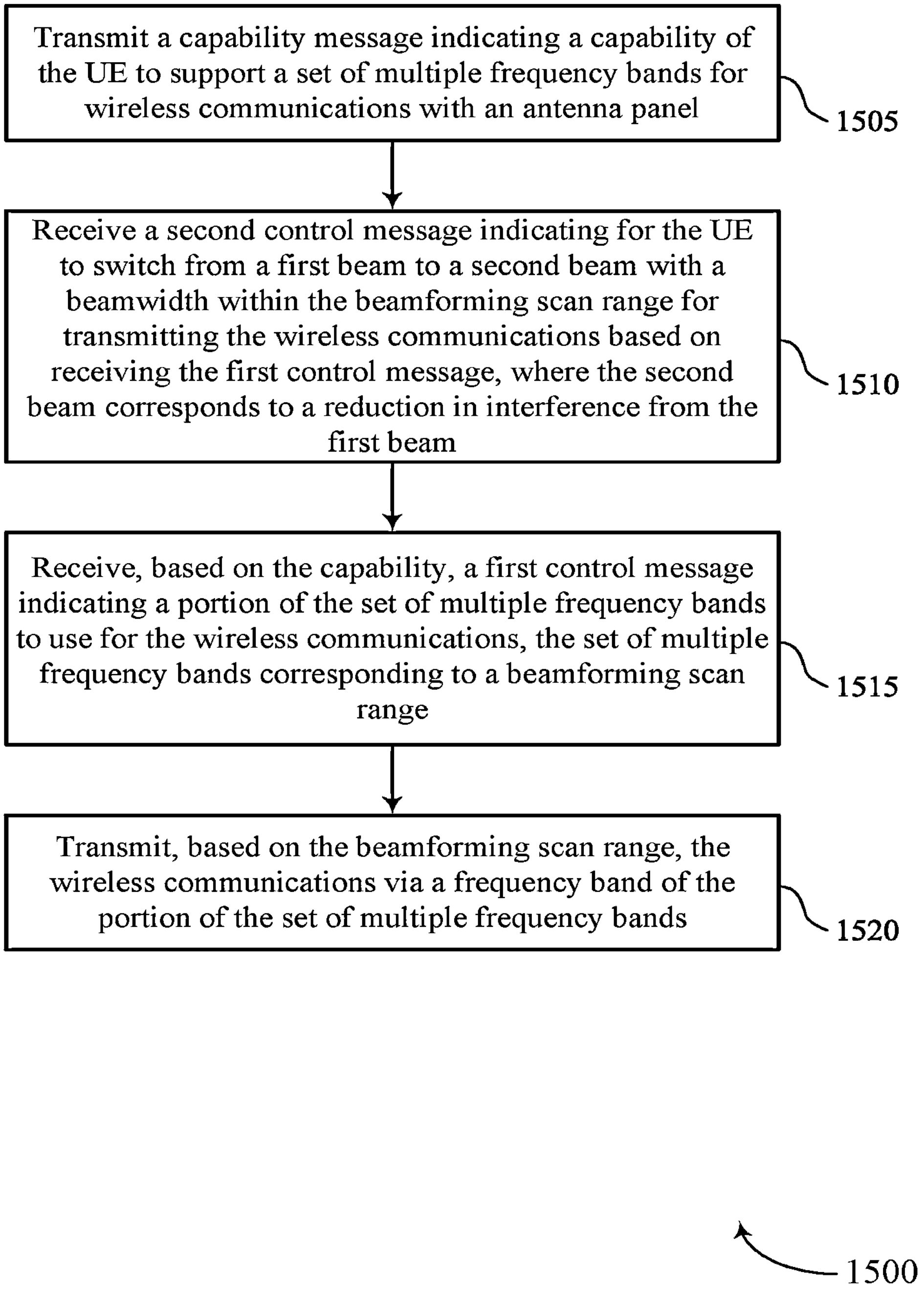

FIG. 15 illustrates a flowchart showing a method 1500 that supports scan range modification with adaptive frequency band usage for multi-band antenna panels in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a capability message indicating a capability of the UE to support a set of multiple frequency bands for wireless communications with an antenna panel. The operations of 1505 may be performed in accordance with examples as disclosed herein. In some examples, aspects of the operations of 1505 may be performed by a capability message component 725 as described with reference to FIG. 7.

At 1510, the method may include receiving a second control message indicating for the UE to switch from a first beam to a second beam with a beamwidth within the beamforming scan range for transmitting the wireless communications based at least in part on receiving the first control message, where the second beam corresponds to a reduction in interference from the first beam. The operations of 1510 may be performed in accordance with examples as disclosed herein. In some examples, aspects of the operations of 1510 may be performed by a beam switch component 750 as described with reference to FIG. 7.

At 1515, the method may include receiving, based at least in part on the capability, a first control message indicating a portion of the set of multiple frequency bands to use for the wireless communications, the set of multiple frequency bands corresponding to a beamforming scan range. The operations of 1515 may be performed in accordance with examples as disclosed herein. In some examples, aspects of the operations of 1515 may be performed by a beamforming scan range component 730 as described with reference to FIG. 7.

At 1520, the method may include transmitting, based at least in part on the beamforming scan range, the wireless communications (e.g., at least a portion of the wireless communications) via a frequency band of the portion of the set of multiple frequency bands. The operations of 1520 may be performed in accordance with examples as disclosed herein. In some examples, aspects of the operations of 1520 may be performed by a frequency band component 735 as described with reference to FIG. 7.

FIG. 16 illustrates a flowchart showing a method 1600 that supports scan range modification with adaptive frequency band usage for multi-band antenna panels in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving a capability message indicating a capability of a UE to support a set of multiple frequency bands for wireless communications with an antenna panel. The operations of 1605 may be performed in accordance with examples as disclosed herein. In some examples, aspects of the operations of 1605 may be performed by a capability message component 1125 as described with reference to FIG. 11.

At 1610, the method may include transmitting, based at least in part on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range. The operations of 1610 may be performed in accordance with examples as disclosed herein. In some examples, aspects of the operations of 1610 may be performed by a beamforming scan range component 1130 as described with reference to FIG. 11.

Figure 17:
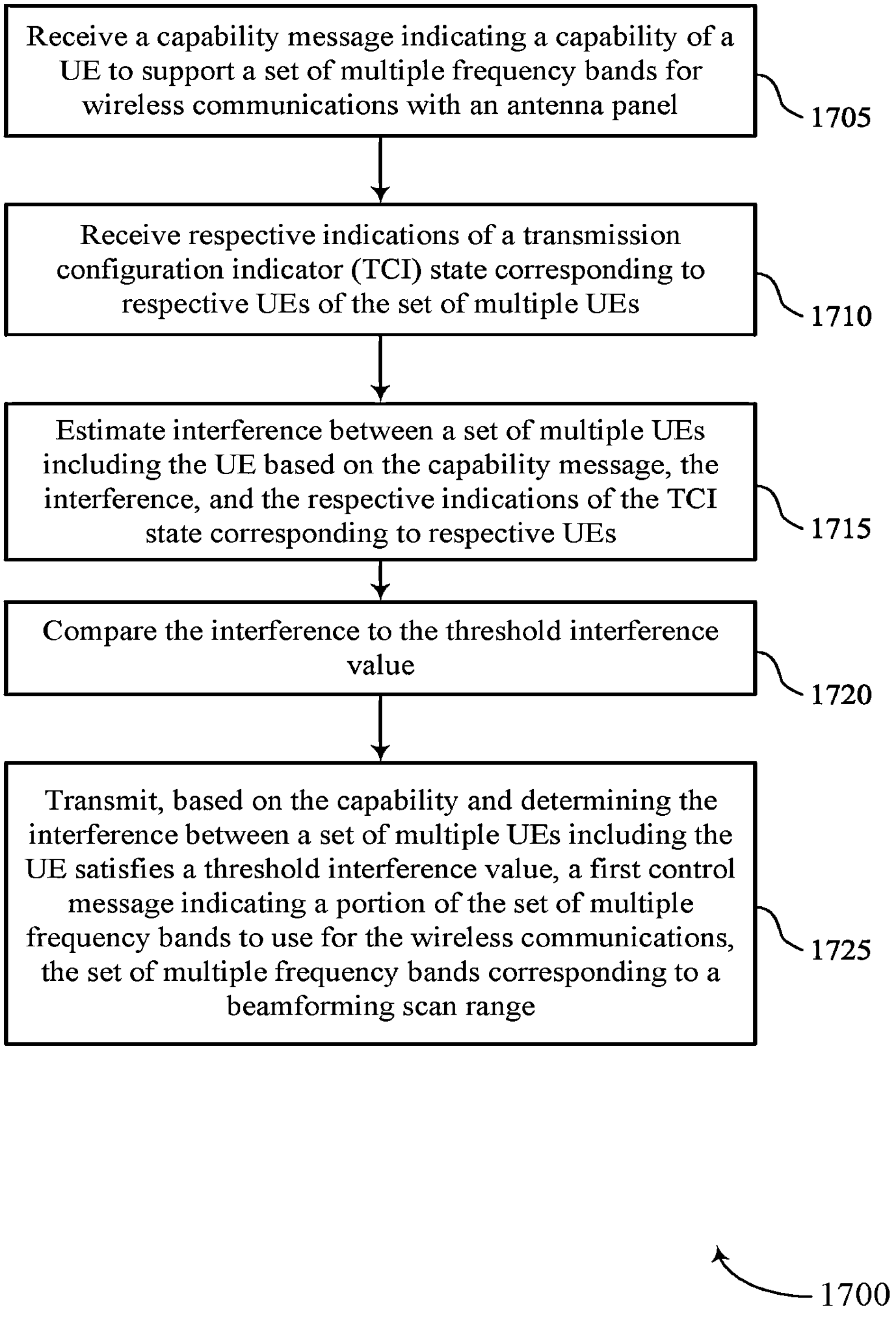

FIG. 17 illustrates a flowchart showing a method 1700 that supports scan range modification with adaptive frequency band usage for multi-band antenna panels in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include receiving a capability message indicating a capability of a UE to support a set of multiple frequency bands for wireless communications with an antenna panel. The operations of 1705 may be performed in accordance with examples as disclosed herein. In some examples, aspects of the operations of 1705 may be performed by a capability message component 1125 as described with reference to FIG. 11.

At 1710, the method may include receiving respective indications of a TCI state corresponding to respective UEs of the set of multiple UEs. The operations of 1710 may be performed in accordance with examples as disclosed herein. In some examples, aspects of the operations of 1710 may be performed by a TCI state component 1135 as described with reference to FIG. 11.

At 1715, the method may include estimating interference between a set of multiple UEs including the UE based at least in part on the capability message, the interference, and the respective indications of the TCI state corresponding to respective UEs. The operations of 1715 may be performed in accordance with examples as disclosed herein. In some examples, aspects of the operations of 1715 may be performed by an interference component 1140 as described with reference to FIG. 11.

At 1720, the method may include comparing the interference to the threshold interference value. The operations of 1720 may be performed in accordance with examples as disclosed herein. In some examples, aspects of the operations of 1720 may be performed by an interference component 1140 as described with reference to FIG. 11.

At 1725, the method may include transmitting, based at least in part on the capability and determining the interference between a set of multiple UEs including the UE satisfies a threshold interference value, a first control message indicating a portion of the set of multiple frequency bands to use for the wireless communications, the set of multiple frequency bands corresponding to a beamforming scan range. The operations of 1725 may be performed in accordance with examples as disclosed herein. In some examples, aspects of the operations of 1725 may be performed by a beamforming scan range component 1130 as described with reference to FIG. 11.

Figure 18:
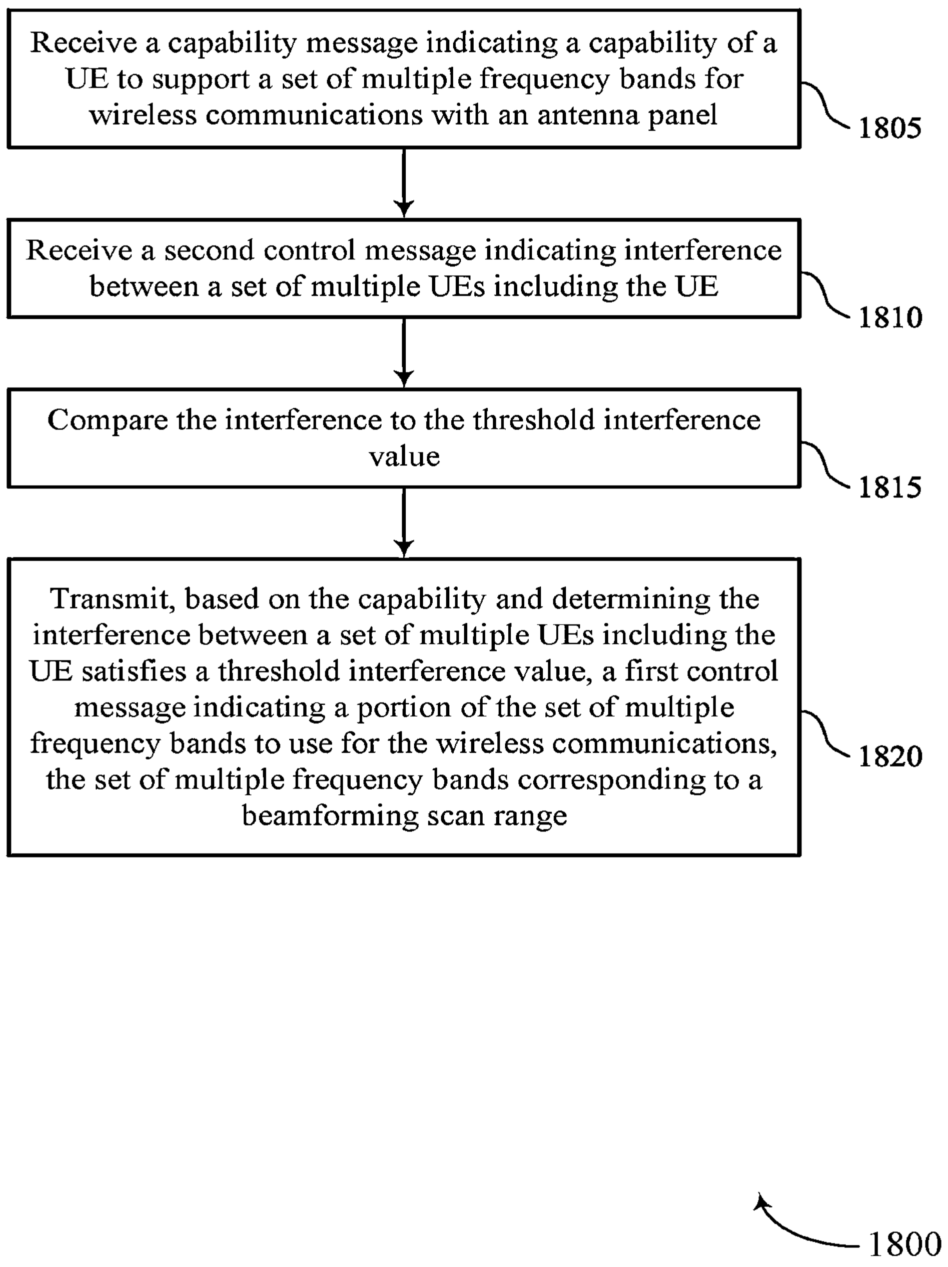

FIG. 18 illustrates a flowchart showing a method 1800 that supports scan range modification with adaptive frequency band usage for multi-band antenna panels in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include receiving a capability message indicating a capability of a UE to support a set of multiple frequency bands for wireless communications with an antenna panel. The operations of 1805 may be performed in accordance with examples as disclosed herein. In some examples, aspects of the operations of 1805 may be performed by a capability message component 1125 as described with reference to FIG. 11.

At 1810, the method may include receiving a second control message indicating interference between a set of multiple UEs including the UE. The operations of 1810 may be performed in accordance with examples as disclosed herein. In some examples, aspects of the operations of 1810 may be performed by an interference component 1145 as described with reference to FIG. 11.

At 1815, the method may include comparing the interference to the threshold interference value. The operations of 1815 may be performed in accordance with examples as disclosed herein. In some examples, aspects of the operations of 1815 may be performed by an interference component 1140 as described with reference to FIG. 11.

At 1820, the method may include transmitting, based at least in part on the capability and determining the interference between a set of multiple UEs including the UE satisfies a threshold interference value, a first control message indicating a portion of the set of multiple frequency bands to use for the wireless communications, the set of multiple frequency bands corresponding to a beamforming scan range. The operations of 1820 may be performed in accordance with examples as disclosed herein. In some examples, aspects of the operations of 1820 may be performed by a beamforming scan range component 1130 as described with reference to FIG. 11.

Figure 19:
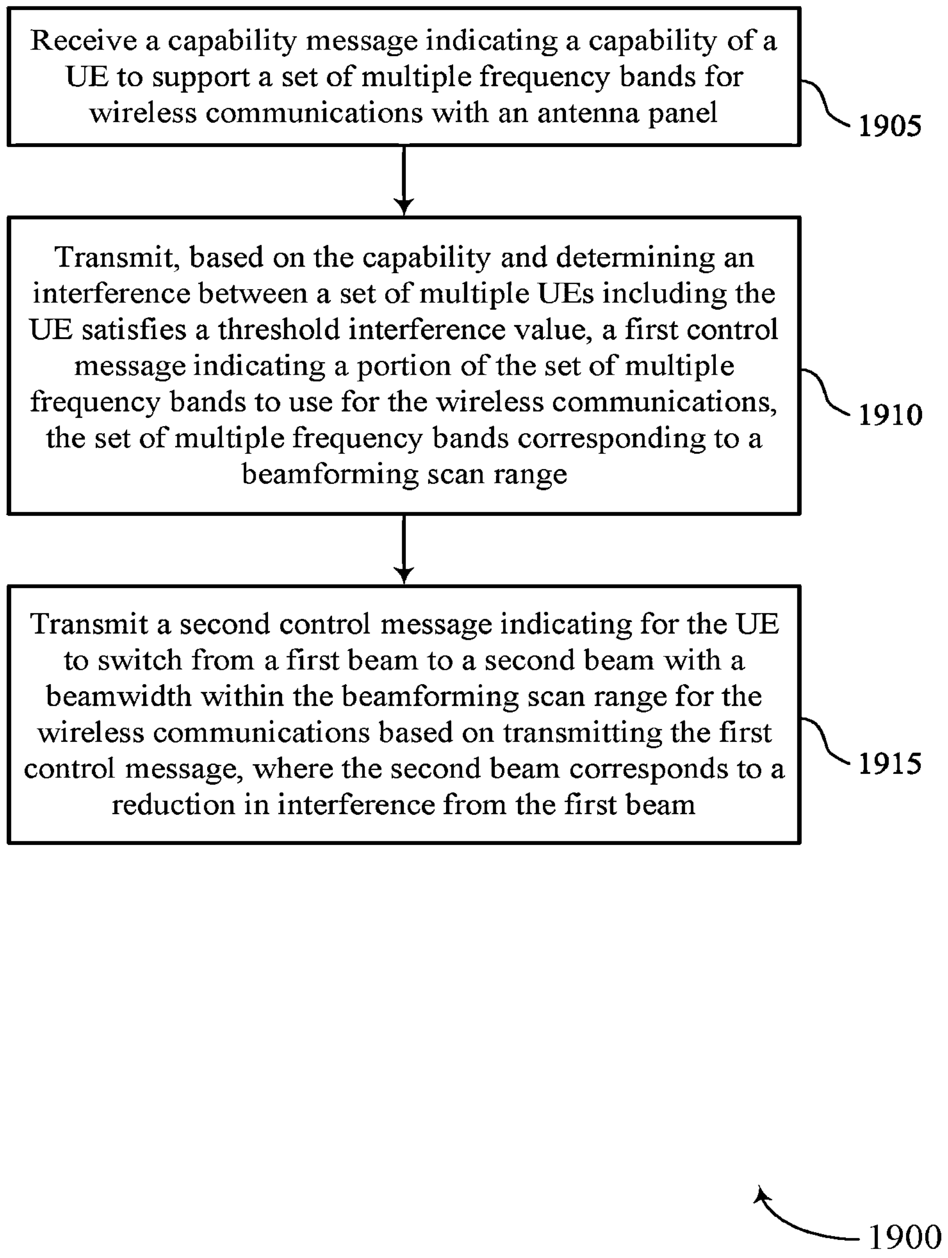

FIG. 19 illustrates a flowchart showing a method 1900 that supports scan range modification with adaptive frequency band usage for multi-band antenna panels in accordance with one or more aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1905, the method may include receiving a capability message indicating a capability of a UE to support a set of multiple frequency bands for wireless communications with an antenna panel. The operations of 1905 may be performed in accordance with examples as disclosed herein. In some examples, aspects of the operations of 1905 may be performed by a capability message component 1125 as described with reference to FIG. 11.

At 1910, the method may include transmitting, based at least in part on the capability and determining an interference between a set of multiple UEs including the UE satisfies a threshold interference value, a first control message indicating a portion of the set of multiple frequency bands to use for the wireless communications, the set of multiple frequency bands corresponding to a beamforming scan range. The operations of 1910 may be performed in accordance with examples as disclosed herein. In some examples, aspects of the operations of 1910 may be performed by a beamforming scan range component 1130 as described with reference to FIG. 11.

At 1915, the method may include transmitting a second control message indicating for the UE to switch from a first beam to a second beam with a beamwidth within the beamforming scan range for the wireless communications based at least in part on transmitting the first control message, where the second beam corresponds to a reduction in interference from the first beam. The operations of 1915 may be performed in accordance with examples as disclosed herein. In some examples, aspects of the operations of 1915 may be performed by a beam switch component 1150 as described with reference to FIG. 11.

The following provides an overview of aspects of the present disclosure:

Aspect 1: A method for wireless communication at a UE, comprising: transmitting a capability message indicating a capability of the UE to support a plurality of frequency bands for wireless communications with an antenna panel; receiving, based at least in part on the capability, a first control message indicating a portion of the plurality of frequency bands to use for the wireless communications, the plurality of frequency bands corresponding to a beamforming scan range; and transmitting, based at least in part on the beamforming scan range, the wireless communications via a frequency band of the portion of the plurality of frequency bands.

Aspect 2: The method of aspect 1, further comprising: transmitting an indication of an interference between a plurality of UEs comprising the UE in the capability message, the interference associated with one or more grating lobes, one or more side lobes, or both corresponding to the antenna panel.

Aspect 3: The method of aspect 2, wherein the plurality of UEs are associated with a same cell.

Aspect 4: The method of aspect 2, wherein the plurality of UEs are associated with a plurality of different cells.

Aspect 5: The method of any of aspects 1 through 4, further comprising: transmitting an indication of a transmission configuration indicator (TCI) state corresponding to the UE, wherein the portion of the plurality of frequency bands and the beamforming scan range is based at least in part on the indication of the TCI state corresponding to the UE.

Aspect 6: The method of any of aspects 1 through 5, further comprising: receiving a second control message indicating for the UE to switch from a first beam to a second beam with a beamwidth within the beamforming scan range for transmitting the wireless communications based at least in part on receiving the first control message, wherein the second beam corresponds to a reduction in interference from the first beam.

Aspect 7: The method of any of aspects 1 through 6, wherein the first control message indicating the portion of the plurality of frequency bands comprises an indication of respective frequency bands of the portion of the plurality of frequency bands.

Aspect 8: The method of any of aspects 1 through 6, wherein the first control message indicating the portion of the plurality of frequency bands comprises a frequency range comprising the portion of the plurality of frequency bands.

Aspect 9: The method of any of aspects 1 through 8, wherein the first control message is a broadcast message to a plurality of UEs comprising the UE.

Aspect 10: A method for wireless communication at a network entity, comprising: receiving a capability message indicating a capability of a UE to support a plurality of frequency bands for wireless communications with an antenna panel; and transmitting, based at least in part on the capability and determining an interference between a plurality of UEs comprising the UE satisfies a threshold interference value, a first control message indicating a portion of the plurality of frequency bands to use for the wireless communications, the plurality of frequency bands corresponding to a beamforming scan range.

Aspect 11: The method of aspect 10, wherein determining the interference between the plurality of UEs comprising the UE satisfies the threshold interference value further comprises: receiving respective indications of a TCI state corresponding to respective UEs of the plurality of UEs; estimating the interference based at least in part on the capability message, the interference, and the respective indications of the TCI state corresponding to respective UEs; and comparing the interference to the threshold interference value.

Aspect 12: The method of aspect 11, wherein the portion of the plurality of frequency bands and the beamforming scan range is based at least in part on the respective indications of the TCI state corresponding to the plurality of UEs.

Aspect 13: The method of any of aspects 10 through 12, wherein determining the interference between the plurality of UEs comprising the UE satisfies the threshold interference value further comprises: receiving a second control message indicating the interference; and comparing the interference to the threshold interference value.

Aspect 14: The method of any of aspects 10 through 13, further comprising: transmitting a second control message indicating for the UE to switch from a first beam to a second beam with a beamwidth within the beamforming scan range for the wireless communications based at least in part on transmitting the first control message, wherein the second beam corresponds to a reduction in interference from the first beam.

Aspect 15: The method of any of aspects 10 through 14, wherein the first control message indicating the portion of the plurality of frequency bands comprises an indication of respective frequency bands of the portion of the plurality of frequency bands.

Aspect 16: The method of any of aspects 10 through 14, wherein the first control message indicating the portion of the plurality of frequency bands comprises a frequency range comprising the portion of the plurality of frequency bands.

Aspect 17: The method of any of aspects 10 through 16, wherein the first control message is a broadcast message to the plurality of UEs.

Aspect 18: An apparatus for wireless communication at a UE, comprising at least one processor; and memory coupled with the at least one processor, the memory storing instructions for the processor to cause the UE to perform a method of any of aspects 1 through 9.

Aspect 19: An apparatus for wireless communication at a UE, comprising at least one means for performing a method of any of aspects 1 through 9.

Aspect 20: A non-transitory computer-readable medium storing code for wireless communication at a UE, the code comprising instructions executable by at least one processor to perform a method of any of aspects 1 through 9.

Aspect 21: An apparatus for wireless communication at a network entity, comprising at least one processor; and memory coupled with the at least one processor, the memory storing instructions for the processor to cause the network entity to perform a method of any of aspects 10 through 17.

Aspect 22: An apparatus for wireless communication at a network entity, comprising at least one means for performing a method of any of aspects 10 through 17.

Aspect 23: A non-transitory computer-readable medium storing code for wireless communication at a network entity, the code comprising instructions executable by at least one processor to perform a method of any of aspects 10 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

at least one processor; and memory coupled with the at least one processor, the memory storing instructions for the at least one processor to cause the UE to:

transmit a capability message indicating a capability of the UE to support a plurality of frequency bands for wireless communications with an antenna panel;

receive, based at least in part on the capability, a first control message indicating a portion of the plurality of frequency bands to use for the wireless communications, the plurality of frequency bands corresponding to a beamforming scan range, and wherein the portion of the plurality of frequency bands corresponds to a reduction of the beamforming scan range; and transmit, based at least in part on the reduction of the beamforming scan range, the wireless communications via a frequency band of the portion of the plurality of frequency bands.

2. The apparatus of claim 1, wherein the instructions are for the at least one processor to further cause the UE to:

transmit an indication of an interference between a plurality of UEs comprising the UE in the capability message, the interference associated with one or more grating lobes, one or more side lobes, or both corresponding to the antenna panel.

3. The apparatus of claim 2, wherein the plurality of UEs are associated with a same cell.

4. The apparatus of claim 2, wherein the plurality of UEs are associated with a plurality of different cells.

5. The apparatus of claim 1, wherein the instructions are for the at least one processor to further cause the UE to:

transmit an indication of a transmission configuration indicator (TCI) state corresponding to the UE, wherein the portion of the plurality of frequency bands and the beamforming scan range is based at least in part on the indication of the TCI state corresponding to the UE.

6. The apparatus of claim 1, wherein the instructions are for the at least one processor to further cause the UE to:

receive a second control message indicating for the UE to switch from a first beam to a second beam with a beamwidth within the beamforming scan range for transmitting the wireless communications based at least in part on receiving the first control message, wherein the second beam corresponds to a reduction in interference from the first beam.

7. The apparatus of claim 1, wherein the first control message indicating the portion of the plurality of frequency bands comprises an indication of respective frequency bands of the portion of the plurality of frequency bands.

8. The apparatus of claim 1, wherein the first control message indicating the portion of the plurality of frequency bands comprises a frequency range comprising the portion of the plurality of frequency bands.

9. The apparatus of claim 1, wherein the first control message is a broadcast message to a plurality of UEs comprising the UE.

10. A method for wireless communication at a user equipment (UE), comprising:

transmitting a capability message indicating a capability of the UE to support a plurality of frequency bands for wireless communications with an antenna panel;

receiving, based at least in part on the capability, a first control message indicating a portion of the plurality of frequency bands to use for the wireless communications, the plurality of frequency bands corresponding to a beamforming scan range, and wherein the portion of the plurality of frequency bands corresponds to a reduction of the beamforming scan range; and transmitting, based at least in part on the reduction of the beamforming scan range, the wireless communications via a frequency band of the portion of the plurality of frequency bands.

11. The method of claim 10, further comprising:

transmitting an indication of an interference between a plurality of UEs comprising the UE in the capability message, the interference associated with one or more grating lobes, one or more side lobes, or both corresponding to the antenna panel.

12. The method of claim 11, wherein the plurality of UEs are associated with a same cell.

13. The method of claim 11, wherein the plurality of UEs are associated with a plurality of different cells.

14. The method of claim 10, further comprising:

transmitting an indication of a transmission configuration indicator (TCI) state corresponding to the UE, wherein the portion of the plurality of frequency bands and the beamforming scan range is based at least in part on the indication of the TCI state corresponding to the UE.

15. The method of claim 10, further comprising:

receiving a second control message indicating for the UE to switch from a first beam to a second beam with a beamwidth within the beamforming scan range for transmitting the wireless communications based at least in part on receiving the first control message, wherein the second beam corresponds to a reduction in interference from the first beam.

16. The method of claim 10, wherein the first control message is a broadcast message to a plurality of UEs comprising the UE.

17. A non-transitory computer-readable medium storing code for wireless communication at a user equipment (UE), the code comprising instructions executable by one or more processors to:

transmit a capability message indicating a capability of the UE to support a plurality of frequency bands for wireless communications with an antenna panel;

receive, based at least in part on the capability, a first control message indicating a portion of the plurality of frequency bands to use for the wireless communications, the plurality of frequency bands corresponding to a beamforming scan range, and wherein the portion of the plurality of frequency bands corresponds to a reduction of the beamforming scan range; and transmit, based at least in part on the reduction of the beamforming scan range, the wireless communications via a frequency band of the portion of the plurality of frequency bands.

18. The non-transitory computer-readable medium of claim 17, wherein the instructions are further executable by the one or more processors to:

transmit an indication of an interference between a plurality of UEs comprising the UE in the capability message, the interference associated with one or more grating lobes, one or more side lobes, or both corresponding to the antenna panel.

19. The non-transitory computer-readable medium of claim 17, wherein the instructions are further executable by the one or more processors to:

transmit an indication of a transmission configuration indicator (TCI) state corresponding to the UE, wherein the portion of the plurality of frequency bands and the beamforming scan range is based at least in part on the indication of the TCI state corresponding to the UE.

20. The non-transitory computer-readable medium of claim 17, wherein the instructions are further executable by the one or more processors to:

receive a second control message indicating for the UE to switch from a first beam to a second beam with a beamwidth within the beamforming scan range for transmitting the wireless communications based at least in part on receiving the first control message, wherein the second beam corresponds to a reduction in interference from the first beam.

* * * * *